US011965742B2

(12) United States Patent
Kinugawa et al.

(10) Patent No.: US 11,965,742 B2
(45) Date of Patent: Apr. 23, 2024

(54) WORK SUPPORT SYSTEM AND WORK SUPPORT DEVICE

(71) Applicant: KUBOTA CORPORATION, Osaka (JP)

(72) Inventors: Ryosuke Kinugawa, Osaka (JP); Keisuke Miura, Osaka (JP)

(73) Assignee: KUBOTA CORPORATION, Osaka (JP)

(*) Notice: Subject to any disclaimer, the term of this patent is extended or adjusted under 35 U.S.C. 154(b) by 470 days.

(21) Appl. No.: 16/951,425

(22) Filed: Nov. 18, 2020

(65) Prior Publication Data

US 2021/0199440 A1    Jul. 1, 2021

(30) Foreign Application Priority Data

Dec. 27, 2019 (JP) ................ 2019-239891
Dec. 27, 2019 (JP) ................ 2019-239892
Dec. 27, 2019 (JP) ................ 2019-239893

(51) Int. Cl.
*G01C 21/20* (2006.01)
*A01B 76/00* (2006.01)
*G01S 19/28* (2010.01)
*G01S 19/51* (2010.01)

(52) U.S. Cl.
CPC ........... *G01C 21/20* (2013.01); *A01B 76/00* (2013.01); *G01S 19/28* (2013.01); *G01S 19/51* (2013.01)

(58) Field of Classification Search
CPC ....... G01C 21/20; A01B 76/00; A01B 79/005; G01S 19/28; G01S 19/51; H04L 67/12; H04W 4/40; H04W 4/022; H04W 4/029
See application file for complete search history.

(56) References Cited

U.S. PATENT DOCUMENTS

| 9,743,239 B1* | 8/2017 | Mishra | H04W 4/023 |
| 2008/0147282 A1* | 6/2008 | Kormann | A01B 69/003 |
| | | | 701/50 |
| 2015/0142308 A1* | 5/2015 | Schmidt | G01C 21/3626 |
| | | | 701/467 |

FOREIGN PATENT DOCUMENTS

| EP | 3 125 060 A1 | 2/2017 |
| JP | 2009-235815 A | 10/2009 |
| JP | 2009-241662 A | 10/2009 |
| JP | 2014-197992 A | 10/2014 |
| JP | 6291393 B | 3/2018 |
| JP | 2019-187352 A | 10/2019 |

(Continued)

OTHER PUBLICATIONS

Notification of Reasons for Rejection in connection with the corresponding Japanese Patent Application No. 2019-239891 dated Nov. 1, 2022, along with English translation thereof.

(Continued)

*Primary Examiner* — James J Yang
(74) *Attorney, Agent, or Firm* — Greenblum & Bernstein, P.L.C.

(57) ABSTRACT

A work support system includes a positioning device to measure a position of a working object based on a signal of a positioning satellite, a notifier to issue notification of the working object based on whether the position of the working object measured by the positioning device is in an area, and an area changer to change a size of the area based on a number of the positioning satellite included in the signal received by the positioning device.

12 Claims, 35 Drawing Sheets

(56) References Cited

FOREIGN PATENT DOCUMENTS

WO 2019/036939 A1 2/2019

OTHER PUBLICATIONS

Notification of Reasons for Rejection in connection with the corresponding Japanese Patent Application No. 2019-239893 dated Nov. 8, 2022, along with English translation thereof.

* cited by examiner

FIG.16

| Working object ID info. | Area info. | |
| --- | --- | --- |
| | Center | Distance |
| Tractor T1 | 135.470,34.559 | 10 km |
| Tractor T2 | 135.470,34.20 | 10 km |
| Tractor T3 | 135.470,34.910 | 10 km |
| ... | ... | ... |
| Implement W1 | 135.566, 34.687 | 10 km |
| Implement W1 | 135.566, 34.687 | 10 km |

| Tractor T1 | | 6 | 7 | 8 | 9 | 10 | 11 | 12 | 13 | 14 | 15 | 16 | 17 | 18 |
|---|---|---|---|---|---|---|---|---|---|---|---|---|---|---|
| | | | | April.18th | | | | | | | | | | |
| | | | | Work area1 Cultivation | | | | Work area2 Cultivation | | | | Work area3 Cultivation | | |
| ... | | | | | | | | ... | | | | | | |

| | | 6 | 7 | 8 | 9 | 10 | 11 | 12 | 13 | 14 | 15 | 16 | 17 | 18 |
|---|---|---|---|---|---|---|---|---|---|---|---|---|---|---|
| | | | | April.5th | | | | | | | | | | |
| Work area H1 | Tractor T1 | | | Cultivation | | | | | | | | | | |
| Work area H2 | Tractor T1 | | | | | | | | Cultivation | | | | | |
| Work area H3 | Tractor T1 | | | | | | | | | | | Weeding | | |

WORK SUPPORT SYSTEM AND WORK SUPPORT DEVICE

CROSS-REFERENCE TO RELATED APPLICATIONS

The present application claims priority under 35 U.S.C. § 119 to Japanese Patent Application No. P2019-239891, filed Dec. 27, 2019, to Japanese Patent Application No. P2019-239892, filed Dec. 27, 2019, and to Japanese Patent Application No. P2019-239893, filed Dec. 27, 2019. The contents of these applications are incorporated herein by reference in their entirety.

BACKGROUND OF THE INVENTION

Field of the Invention

The present invention relates to a work support system for supporting a working object such as an agriculture machine and to a work support device for supporting the working object.

Description of Related Art

Japanese Unexamined Patent Publication No. 2014-197992 is previously known as a technology for displaying a trajectory of movement of an agricultural machine in a case where the agricultural machine is moved while performing work. The work management system of Japanese Unexamined Patent Publication No. 2014-197992 includes an information obtaining portion that acquires a position of the working machine and a time at the position of the working machine when the work is performed, a time inputting portion that inputs a specified time, a display portion to display a work area map displaying the position of the working machine at the specified time with a work area overlapped based on the position of the working machine and the time acquired by the information obtaining portion, a work area selecting portion for allowing an operator who operated the working machine to select a work area displayed on the work area map, an arithmetic processing portion that associates the work area selected by the work area selecting portion with the working machine position at a specified time displayed on the display portion, and a storage portion that stores the working machine position at a specified time associated by the arithmetic processing portion and the work area selected by the work area selecting portion as a work record corresponding to an operator who operated the working machine.

In addition, the monitoring system for the agricultural machine of Japanese Patent Publication No. 6291393 includes a communicator device having a first obtaining portion capable of obtaining the agricultural results of agricultural operations performed by the agricultural machine, and a mobile terminal that performs wireless communication with the communicator device. The mobile terminal having a second obtaining portion capable of obtaining the agricultural results, a detecting portion that detects installation at a predetermined location, and a monitoring portion to monitor an agricultural machine when the detecting portion detects the installation at a predetermined location. The detecting portion detects that the mobile terminal has been housed in a storage area where the agricultural machine is stored or in a storage box installed around the storage area.

SUMMARY OF THE INVENTION

A work support system includes: a positioning device to measure a position of a working object based on a signal of a positioning satellite; a notifier to issue notification of the working object based on whether the position of the working object measured by the positioning device is in an area; and an area changer to change a size of the area based on a number of the positioning satellite included in the signal received by the positioning device.

A work support system, includes: a notifier to issue notification relating to the working object based on whether the working object positions in an area; and an area setter to set the area including a work area in which the working object performs work and a rest area in which the working object does not perform the work.

A work support device includes: an area storage to store areas respectively related to a plurality of working objects; a notifier to issue notification of the working object based on whether a position of the working object is in the area related to the working object; an area changer to, when a non-corresponding working object other than a corresponding working object that corresponds to one of the areas positions in the one of the areas, change another area that corresponds to the non-corresponding working object to the one of the areas corresponding to the corresponding working object.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 16 is a view illustrating an example of area information according to embodiments of the present invention;

FIG. 24 is a view illustrating an example of area information according to a third embodiment of the present invention;

FIG. 28 is a view illustrating an example of a work plan according to a fourth embodiment of the present invention;

DESCRIPTION OF THE EMBODIMENTS

Figure 1:
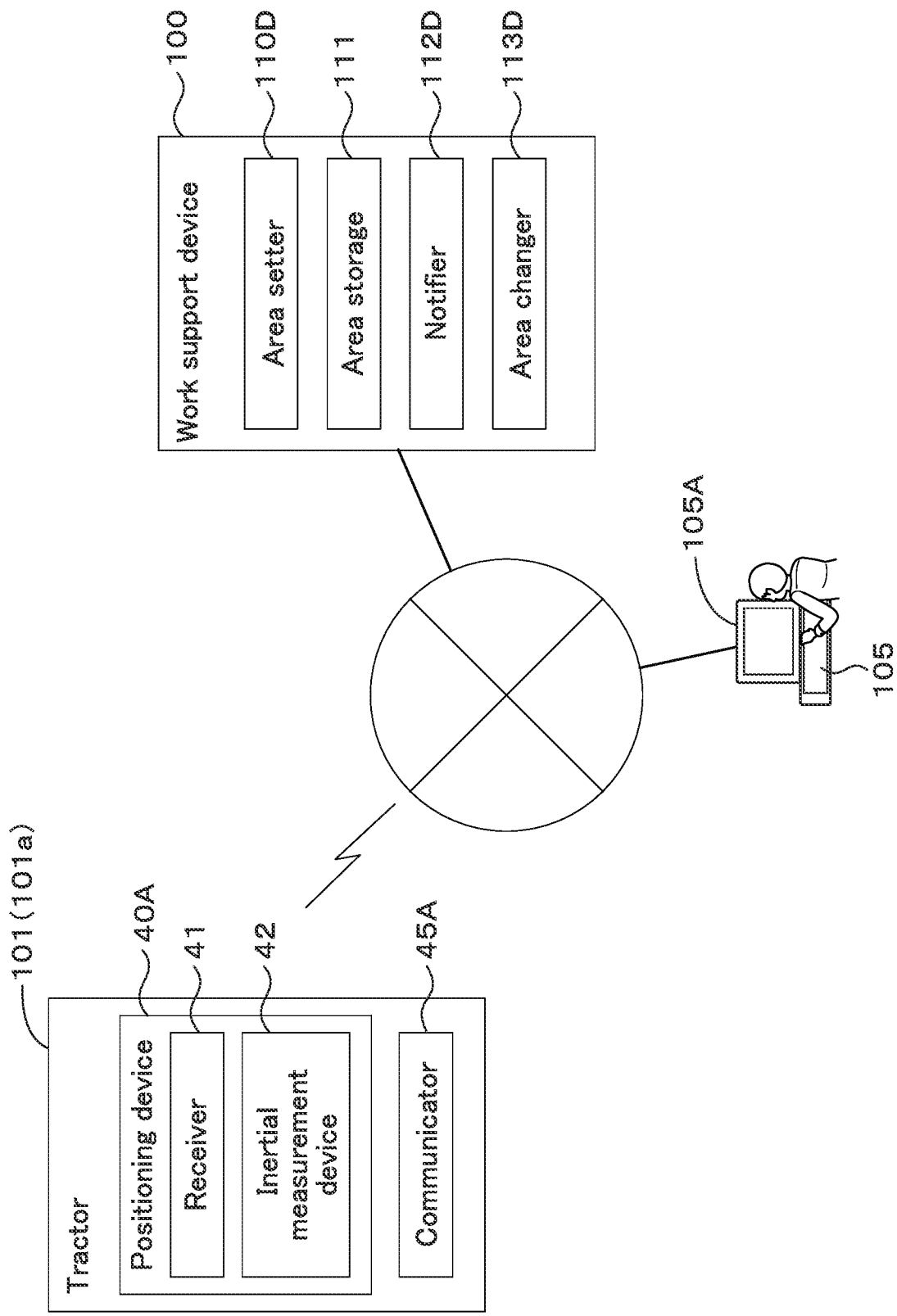
FIG. 1 is a view illustrating a work support system according to embodiments of the present invention.

The embodiments of the present invention will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with appropriate reference to the drawings.

First Embodiment

FIG. 1 shows a work support system. The work support system is provided with a work support device 100. The work support device 100 is a device that supports the working object 101 and the like. The working object 101 includes agricultural machine such as tractors, combines, rice planters, and the like, and construction machinery such as backhoes, that is, industrial machinery.

The work support device 100 is an stationary computer, such as a server, or a portable computer, such as a smart phone, tablet, laptop, or the like. In this embodiment, the description of the work support device 100 will proceed, assuming that the work support device 100 is a server.

Figure 30:
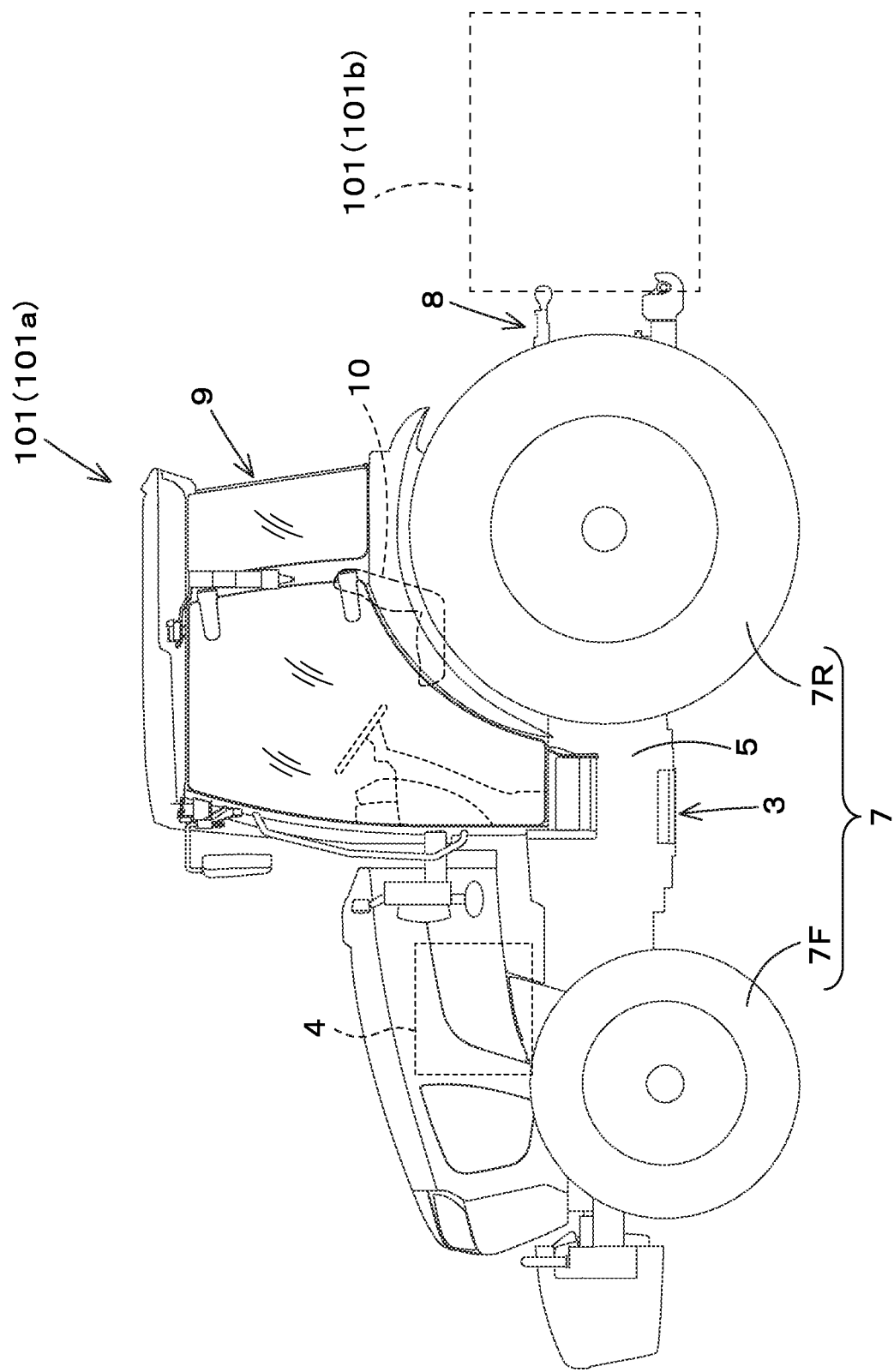
FIG. 30 is a whole view of a tractor according to embodiments of the present invention.

FIG. 30 shows a side view of the working object 101, a tractor, which is one of the agricultural machines.

In the embodiment of the present invention, the front side of an operator seated on the operator seat 10 of the tractor is referred to as the front, the rear side of the operator is referred to as the rear, the left side of the operator is referred to as the left, and the right side of the operator is referred to as the right. In addition, the horizontal direction, which is a direction orthogonal to the front-rear direction, will be described as the machine width direction.

As shown in FIG. 30, the tractor is provided with a vehicle body 3, a prime mover 4, and a speed-shifter device 5. The vehicle body 3 has a traveling device 7, which is capable of traveling. The traveling device 7 is a device having a front wheel 7F and a rear wheel 7R. The front wheels 7F may be of the tire type or crawler type. The rear wheels 7R may also be of the tire type or crawler type.

The prime mover 4 includes a diesel engine, an electric motor or the like, which in this embodiment is a diesel engine. The speed-shifter device 5 is capable of switching the propulsion power of the traveling device 7 by shifting gears and of switching the traveling device 7 forward or backward. The vehicle body 3 is provided with a operator seat 10.

At the rear portion of the vehicle body 3, a coupling portion consisting of a three-point linkage mechanism or the like is provided. The coupling portion is a lifter device 8 which can attach and detach the working device (implement) 101b and which can pull the working device (implement) 101b. By coupling the implement to the lifter device 8, the implement can be towed by the vehicle body 3.

The coupling portion may be a pulling device that does not lift or lower the implement. The implement is a cultivating device for cultivating, a ridging device for ridging, a planting device for planting crops, a fertilizer sprayer device for spraying fertilizer, a pesticide sprayer device for spraying pesticides, a harvester device for harvesting, a mower device for harvesting pasture or the like, a tedder device for diffusing pasture or the like, a grass rake device for collecting pasture or the like, and a baler device for molding pasture or the like.

Figure 2:
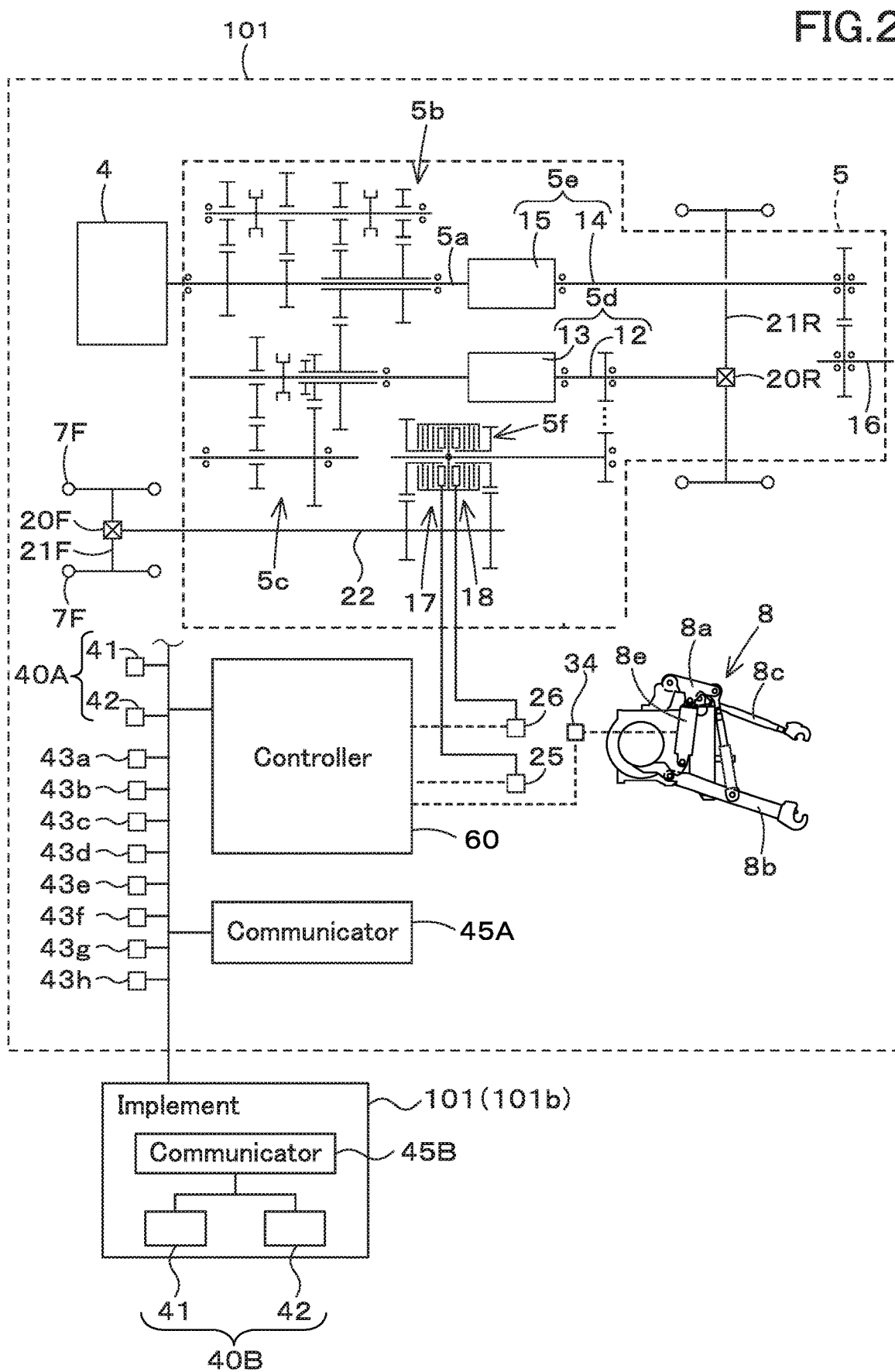
FIG. 2 is a view illustrating a control block diagram according to embodiments of the present invention.

As shown in FIG. 2, the speed-shifter device 5 is provided with a main shaft (propulsion shaft) 5a, a main shifter portion 5b, a sub shifter portion 5c, a shuttle portion 5d, a PTO power transmission portion 5e, and a front shifter portion 5f. The propulsion shaft 5a is rotatably supported in the housing case (mission case) of the speed-shifter device 5, and power from the crankshaft of the prime mover 4 is transmitted to the propulsion shaft 5a.

The main shifter portion 5b has a plurality of gears and a shifter for changing the engagements of the gears. The main shifter portion 5b changes the connection (engagement) of the plurality of gears with the shifter as appropriate, thereby modifying the rotation input from the propulsion shaft 5a and outputting the rotation (shifting the speed).

The sub shifter portion 5c, like the main shifter portion 5b, has a plurality of gears and a shifter for changing the engagements of the gears. The sub shifter portion 5c modifies the rotation input from the main shifter portion 5b and outputs (shifting gears) by changing the connection (engagement) of the plurality of gears with the shifter accordingly.

The shuttle portion 5d has a shuttle shaft 12 and a forward/backward switching portion 13. The power output from the sub shifter portion 5c is transmitted to the shuttle shaft 12 via a gear or the like. The forward/backward switching portion 13 includes, for example, a hydraulic clutch or the like, and switches the direction of rotation of the shuttle shaft 12 by turning the hydraulic clutch on and off, that is, switching the forward and backward movement of the tractor. The shuttle shaft 12 is connected to the rear wheel differential device 20R. The rear wheel differential device 20R rotatably supports the rear axle 21R to which the rear wheels 7R are attached.

The PTO power transmission portion 5e has a PTO propulsion shaft 14 and a PTO clutch 15. The PTO propulsion shaft 14 is rotatably supported and is capable of transmitting power from the propulsion shaft 5a. The PTO propulsion shaft 14 is connected to the PTO shaft 16 via a gear or the like.

The PTO clutch 15 includes, for example, a hydraulic clutch or the like, and is switched between a state in which the power of the propulsion shaft 5a is transmitted to the PTO propulsion shaft 14 and a state in which the power of the propulsion shaft 5a is not transmitted to the PTO propulsion shaft 14 by turning the hydraulic clutch on and off.

The front shifter portion 5f has a first clutch 17 and a second clutch 18. The first clutch 17 and the second clutch 18 are capable of transmitting power from the propulsion shaft 5a, for example, the power of the shuttle shaft 12 is transmitted through the gears and the transmission shaft.

The power from the first clutch 17 and the second clutch 18 can be transmitted to the front axle 21F via the front transmission shaft 22. In particular, the front transmission shaft 22 is connected to the front wheel differential device 20F, and the front wheel differential device 20F rotatably supports the front axle 21F to which the front wheels 7F are mounted.

The first clutch 17 and the second clutch 18 include a hydraulic clutch or the like. A fluid line is connected to the first clutch 17, and the fluid line is connected to a first operation valve 25, to which hydraulic fluid discharged from the hydraulic pump is supplied. The first clutch 17 is switched between a connected state and a disconnected state depending on the degree of opening of the first operation valve 25.

An fluid line is connected to the second clutch 18, and the fluid line is connected to the second operation valve 26. The second clutch 18 is switched between a connected state and a disconnected state depending on the degree of opening of the second operation valve 26. The first and second operation valves 25 and 26 are, for example, two-position switching valves with solenoid valves, which are switched to a connected or disconnected state by excitation or demagnetization of the solenoid valve solenoids.

When the first clutch 17 is disconnected and the second clutch 18 is connected, the power of the shuttle shaft 12 is transmitted to the front wheels 7F through the second clutch 18. This results in four-wheel drive (4WD) in which the front wheels 7F and the rear wheels 7R are driven by the power, and the rotation speeds of the front wheels 7F and the rear wheels 7R are approximately the same (4WD constant speed state).

On the other hand, when the first clutch 17 is connected and the second clutch 18 is disconnected, four-wheel drive is provided and the rotational speed of the front wheels 7F becomes higher than that of the rear wheels 7R (4WD accelerating speed state). When the first clutch 17 and the second clutch 18 are disconnected, the power of the shuttle axle 12 is not transmitted to the front wheels 7F, and therefore the rear wheels 7R become two-wheel drive (2WD) driven by the power.

Figure 3:
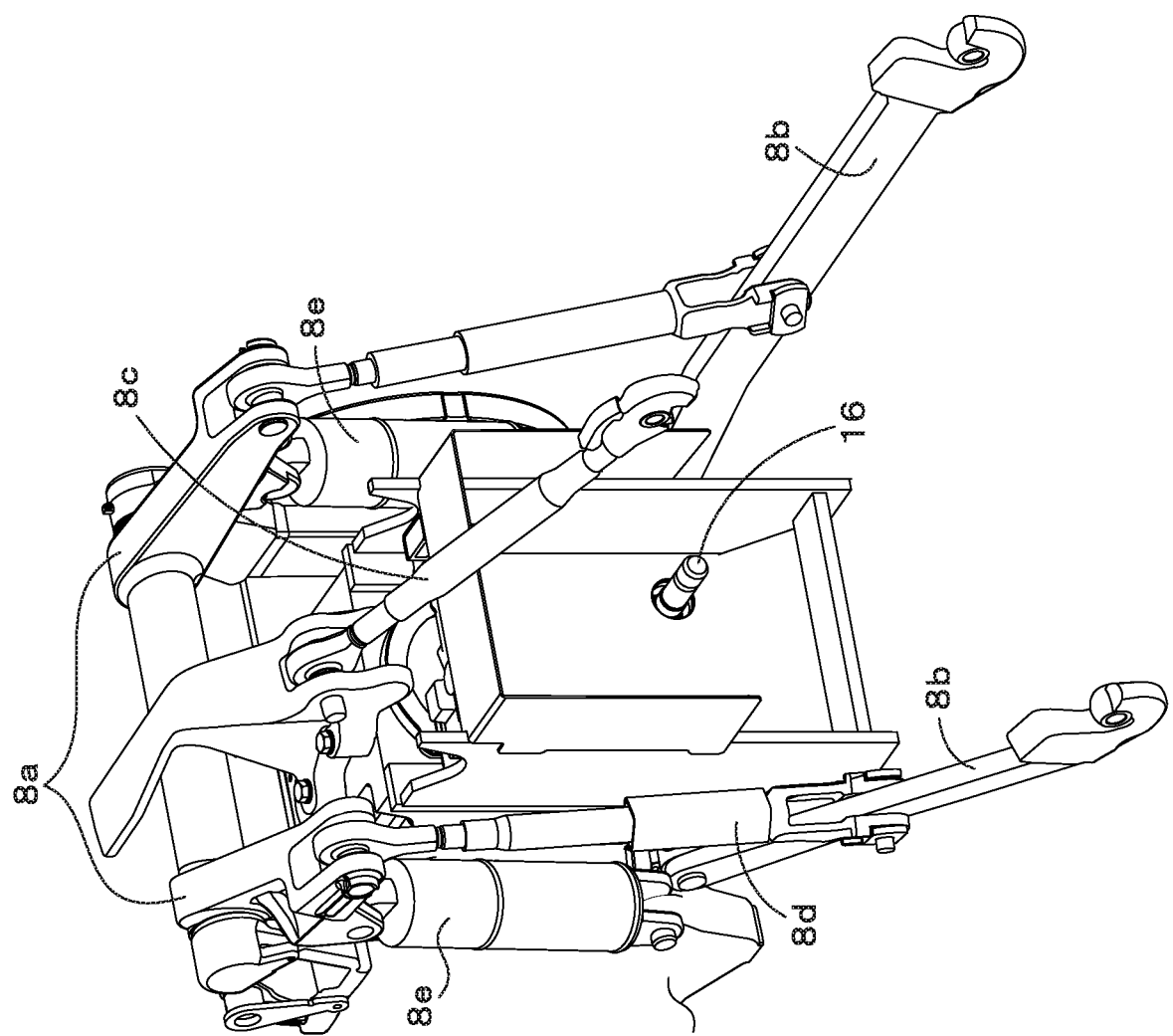
FIG. 3 is a view illustrating a lifter device according to embodiments of the present invention.

As shown in FIG. 2 and FIG. 3, the lifter device 8 has a lift arm 8a, a lower link 8b, a top link 8c, a lift rod 8d, and a lift cylinder 8e. The front end portion of the lift arm 8a is pivotally supported upwardly or downwardly in the upper rear portion of the case (transmission case) housing the speed-shifter device 5.

The lift arm 8a is pivoted (raised or lowered) by the drive of the lift cylinder 8e. The lift cylinder 8e includes a hydraulic cylinder. The lift cylinder 8e is connected to a hydraulic pump via a control valve 34. The control valve 34 is a solenoid valve or the like, which extends and shortens the lift cylinder 8e.

The front end of the lower link 8b is pivotally supported upwardly or downwardly in the rear lower portion of the speed-shifter device 5. The front end portion of the top link 8c is pivotally supported upwardly or downwardly on the rear portion of the speed-shifter device 5 above the lower link 8b. A lift rod 8d connects the lift arm 8a to the lower link 8b.

Implements are connected to the rear portion of the lower link 8b and the rear portion of the top link 8c. When the lift cylinder 8e is driven (telescoping), the lift arm 8a is raised and lowered, and the lower link 8b connected to the lift arm 8a via the lift rod 8d is raised and lowered. This causes the implements to pivot upwardly or downwardly (raise and lower) with the front of the lower link 8b as the fulcrum.

As shown in FIG. 2, the tractor is provided with a positioning device 40A. The positioning device 40A is capable of detecting its own position (positioning information including latitude and longitude) by a satellite positioning system (positioning satellites) such as D-GPS, GPS, GLONASS, HOKUTO, GALILEO, MICHIBIKI, and the like.

That is, the positioning device 40A receives a satellite signal (such as a position of a positioning satellite, transmission time, correction information, and the like) transmitted from a positioning satellite and detects a position (for example, latitude and longitude) based on the satellite signal. The positioning device 40A has a receiver device 41 and an Inertial Measurement Unit (IMU) 42.

The receiver device 41 has an antenna or the like and receives satellite signals transmitted from a positioning satellite, and is attached to the vehicle body 3 separately from the inertial measurement unit 42. In this embodiment, the receiver device 41 is mounted in the cabin 9 provided in the vehicle body 3. The attachment point of the receiver device 41 is not limited to the embodiment.

The inertial measurement unit 42 has an acceleration sensor to detect acceleration, a gyroscope to detect angular velocity, and the like. The vehicle body 3, for example, is installed below the operator seat 10, and the roll angle, pitch angle, yaw angle, and the like of the vehicle body 3 can be detected by the inertial measurement unit 42.

As shown in FIG. 2, the tractor is provided with a communicator device 45A. The communicator device 45A is capable of communicating with an external network (outside) that is different from the on-board network N1. The communicator device 45A, for example, is capable of communicating with the IEEE 802.11 series Wi-Fi (Wireless Fidelity, registered trademark), BLE (Bluetooth (registered trademark) Low Energy), LPWA (Low Power, Wide Area), LPWAN (Low-Power Wide-Area Network), and the like.

The communicator device 45A can, for example, communicate wirelessly by means of a cellular telephone communication network or a data communication network. The communicator device 45A transmits the body position (position of the working object 101) and operation information and the like detected by the positioning device 40A to the work support device 100.

As shown in FIG. 2, the tractor is provided with a controller device 60. The controller device 60 is a device for controlling the driving system and computing the control of the work system in the tractor.

When the shuttle lever 43a, which switches the vehicle body 3 forward or backward, is operated to forward, the controller device 60 causes the vehicle body 3 to move forward by switching the forward/backward switching portion 13 to forward. When the shuttle lever 43a is operated in the backward direction, the controller device 60 switches the forward/backward switching portion 13 to backward to move the vehicle body 3 backward.

When the ignition switch 43b is operated to ON, the controller device 60 starts the prime mover 4 through a predetermined process, and when the ignition switch 43b is operated to OFF, the drive of the prime mover 4 is stopped. When the PTO transmission lever 43c is operated, the controller device 60 changes the number of revolutions of the PTO shaft (referred to as the PTO speed) by switching the PTO transmission gear incorporated in the speed-shifter device 5.

When the speed-shifter switch 43d is switched to automatic transmission, the controller device 60 automatically switches either the main shifter portion 5b or the sub shifter portion 5c according to the condition of the tractor, and automatically changes the gear shift (transmission level) of the speed-shifter device 5 to a predetermined gear shift (transmission level).

When the speed-shifter switch 43d is switched to manual transmission, the controller device 60 automatically switches one of the main shifter portion 5b and the sub shifter portion 5c in accordance with the gear shift level (gear shift level) set by the gear shift lever 43e, and changes the gear shift level of the speed-shifter device 5.

When the accelerator 43f is operated, the controller device 60 changes the speed (vehicle speed) of the vehicle body 3 by changing the number of revolutions of the prime mover 4 (referred to as the prime mover speed) according to the amount of operation of the accelerator 43f. When the one-touch switch 43g is operated in the direction of raising the one-touch switch 43g (in the upward direction), the controller device 60 extends the lift cylinder 8e by controlling the control valve 34 to raise the rear end portion of the lift arm 8a (the end portion of the implement side).

When the one-touch switch 43g is operated in the direction of lowering (downward side), the controller device 60 contracts the lift cylinder 8e by controlling the control valve 34 to lower the rear end portion of the lift arm 8a (the end portion of the implement side).

The controller device 60 stops the raising operation in the lifter device 8 when the position of the impulse, that is, the angle of the lift arm 8a reaches the upper limit (the upper height limit value) set by the upper limit setting dial 43h when the impulse is raised by the lifter device 8.

As shown in FIG. 1, the work support device (server) 100 has an area setter portion 110D and an area storage portion 111. The area setter portion 110D includes an electrical and electronic circuit in the work support device 100, a program stored in the work support device 100, and the like. The area storage portion 111 includes a non-volatile memory or the like.

Figure 6A:
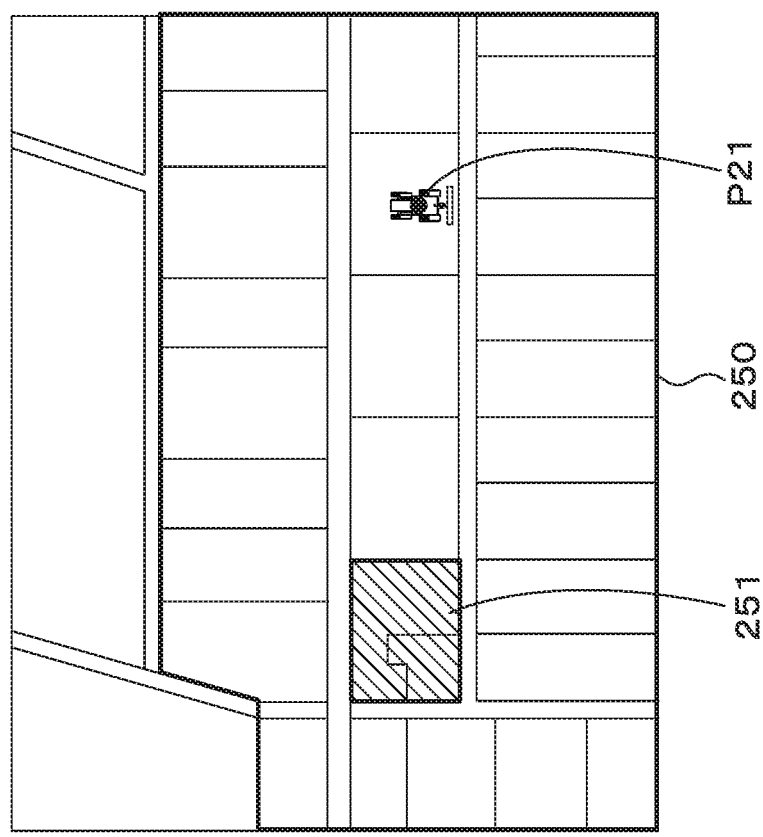
FIG. 6A is a view illustrating a state where a first vehicle position (a working object) positions in a work area according to embodiments of the present invention.
Figure 6B:
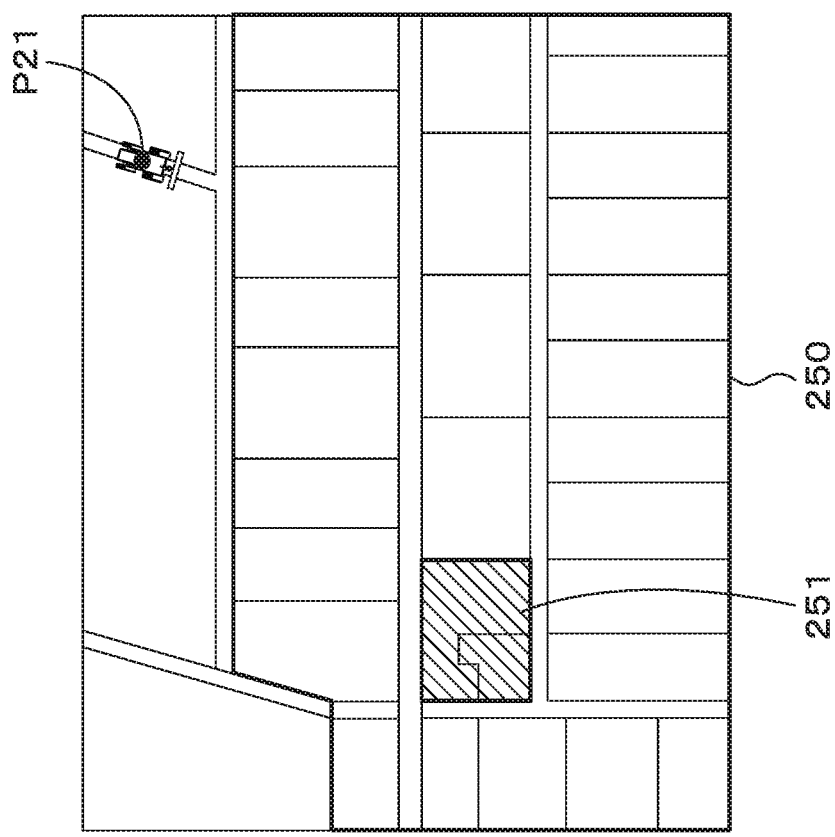
FIG. 6B is a view illustrating a state where a first vehicle position (a working object) positions outside a work area according to embodiments of the present invention.

As shown in FIG. 6A and FIG. 6B, the area setter portion 110D sets a work area 250 when the working object 101 performs work and a rest area 251 when the working object 101 does not perform work.

Figure 4:
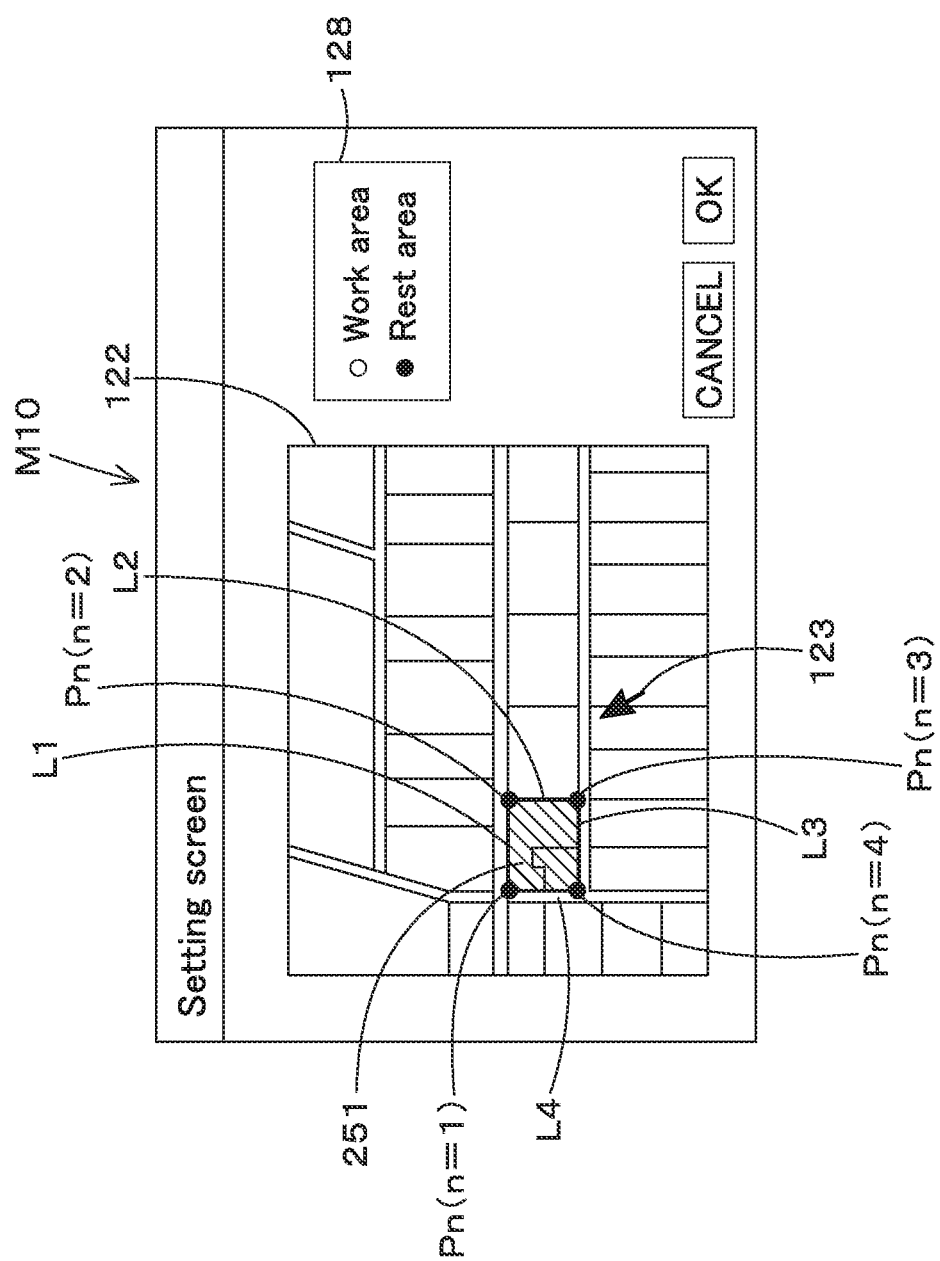
FIG. 4 is a view illustrating an example of a setting screen M10 according to embodiments of the present invention.

In particular, as shown in FIG. 1, when a stationary computer 105, different from the work support device (server) 100, is connected to the work support device (server) 100 and a predetermined operation is performed on the stationary computer 105, the setting screen M10 is displayed on the monitor or other display portion 105A of the stationary computer 105, as shown in FIG. 4.

The setting screen M1 includes a map display portion 122, which displays a map, a type input portion 128, and a pointer 123 for selecting any point on the map. The map display portion 122 is a portion that displays a map including roads, farm roads, fields and other work areas, buildings, and the like.

The map to be displayed on the map display portion 122 may be, for example, a map obtained from a map provider who provides data for the map, or it may be a map created by an stationary computer 105 or the like, but is not limited thereto.

The type input portion 128 is the part for inputting whether to set the work area 250 or the rest area 251. Selecting "work area" sets the first setting mode for setting the work area 250, and selecting "rest area" sets the second setting mode for setting the rest area 251.

As shown in FIG. 4, the pointer 123 can select any point on the map display portion 122. When any point P1 is selected by the pointer 123, the area setter portion 110D retains the position (latitude and longitude) on the selected map.

When a plurality of arbitrary points Pn (n=1, 2, 3 . . . ) are selected by the pointer 123, the area setter portion 110D displays a line (boundary line) Li (i=1, 2, 3 . . . ) connecting the plurality of arbitrary points Pn (i=1, 2, 3 . . . ) on the map display portion 122, and sets the area surrounded by the plurality of boundary lines Li as either a work area 250 or a rest area 251.

Figure 5A:
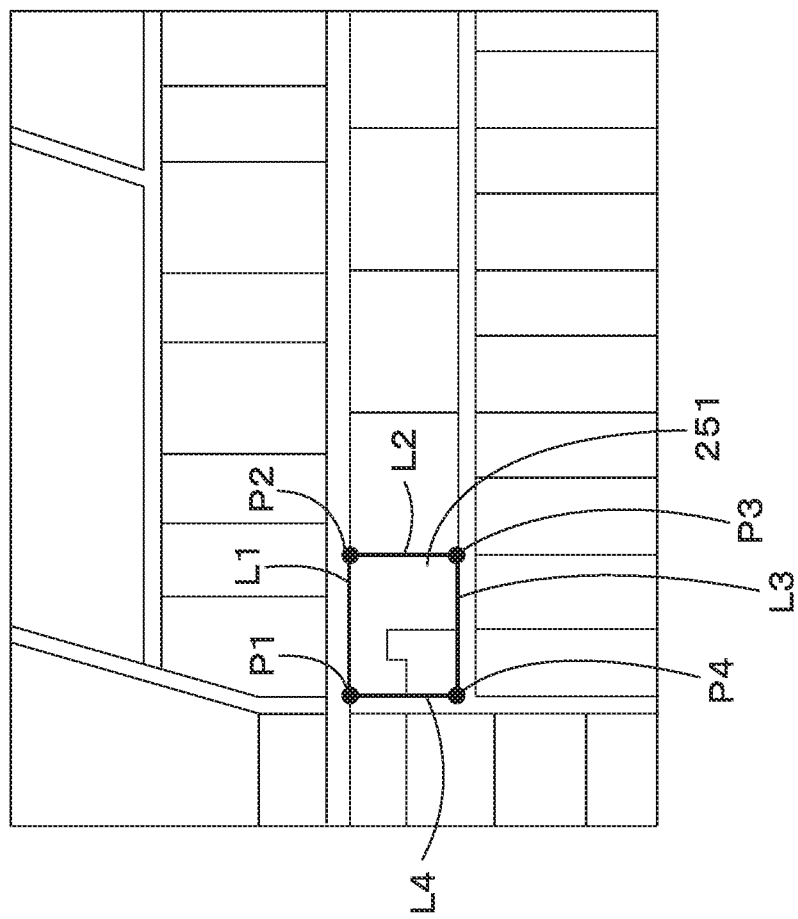
FIG. 5A is an explanation view explaining setting of area in a second setting mode according to embodiments of the present invention.

In detail, as shown in FIG. 5A, as shown in FIG. 5A, when any point P1 to P4 is selected by the pointer 123 in the second setting mode, the area setter portion 110D creates a plurality of boundary lines Li (L1 to L4) connecting any point P1 to P4 in sequence. The area setter portion 110D sets the area surrounded by the boundary lines Li (L1 to L4) as the rest area 251.

Figure 5B:
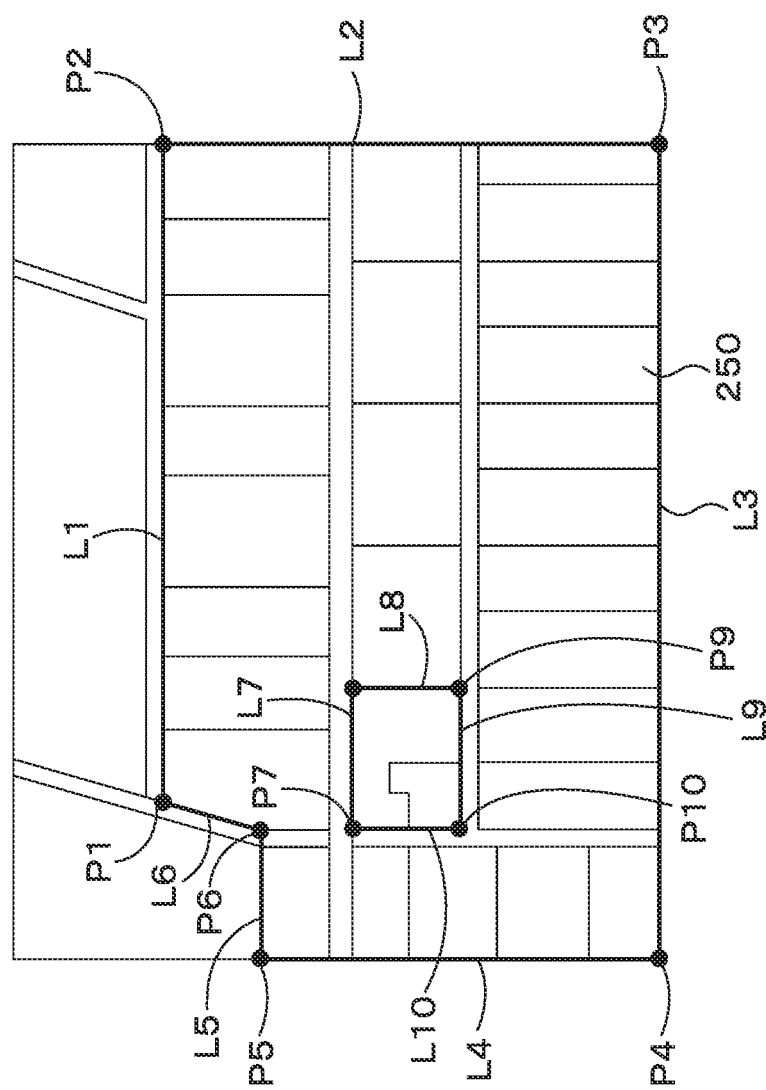
FIG. 5B is an explanation view explaining setting of area in a first setting mode according to embodiments of the present invention.

As shown in FIG. 5B, as shown in FIG. 5B, when a plurality of boundary lines Li (L1-L10) are selected by the pointer 123 in the first setting mode, the area setter portion 110D creates a plurality of boundary lines Li (L1-L10) connecting any point P1-P10 in order.

As shown in FIG. 5B, the area setter portion 110D creates an endless line (annular line) formed by the boundary lines L1-L6 and an endless line (annular line) formed by the boundary lines L7-L10 by selecting the pointer 123. The area setter portion 110D sets a work area 250 between the endless line formed by the boundary line Li (L1-L6) and the endless line formed by the boundary line Li (L7-L10).

The area information set by the area setter portion 110D (information indicating the work area 250 and the rest area 251) is stored in the area storage portion 111.

In the above-described failure to implement, the boundary area between the rest area 251 and the work area 250 was also set at L7 to L10, but in the situation where the rest area 251 is set before the work area 250, the area setter portion 110D may set the portion excluding the paused area from the setting area to the work area 250 when the setting area surrounded by the boundary line Li of the work area 250 includes the rest area 251.

In a situation where the work area 250 is set prior to the rest area 251, the area setter portion 110D may set the portion of the setting area excluding the work area from the setting area to the rest area 251 when the setting area surrounded by the boundary line Li of the rest area 251 includes the work area 250.

The work support device (server) 100 has a notifier portion 112D. The notifier portion 112D includes electrical and electronic circuits in the work support device 100, a program stored in the work support device 100, and the like.

The notifier portion 112D notifies the working object 101 based on whether or not the working object 101 is located in a predetermined area (work area 250, rest area 251).

When the notifier portion 112D receives the body position of the working object 101 (first body position) and the operation information of the working object 101 and the operation information of the working object 101 from the work support device (server) 100, the notifier portion 112D refers to the operation information and determines whether or not the working object 101 is operating based on the operation information.

For example, when the work support device (server) 100 receives the number of rotations of the prime mover (prime mover speed), the number of rotations of the PTO shaft (PTO speed), and the like from the working object 101 of the tractor or the like as operating information, the notifier portion 112D determines whether or not the prime mover speed and PTO speed are not zero. When the prime mover speed and PTO speed are not zero, the notifier portion 112D determines whether or not the first body position P21 of the working object 101 is located in the work area 250, assuming the working object 101 is in operation.

As shown in FIG. 6A, the notifier portion 112D does not notify when the first body position P21 is within the work area 250, and as shown in FIG. 6B, when the first body position P21 is outside the work area 250, it notifies the stationary computer 105 and the like that the working object 101 is out of the work area 250.

On the other hand, when either the prime mover speed or the PTO speed is zero, the notifier portion 112D determines whether the first body position P21 of the working object 101 is located in the rest area 251, assuming that the working object 101 is not in operation.

Figure 7A:
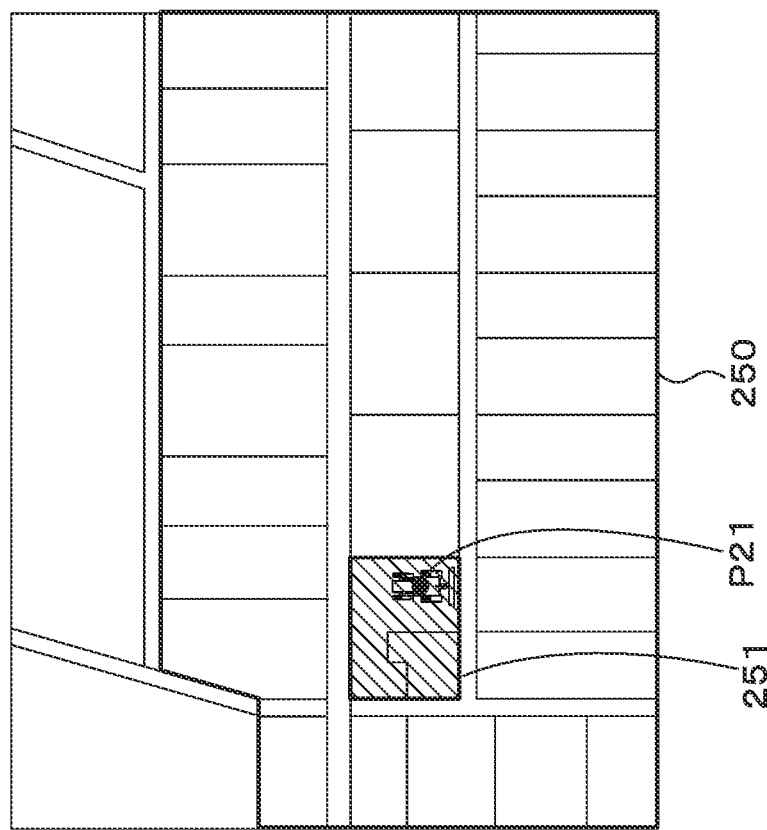
FIG. 7A is a view illustrating a state where a first vehicle position (a working object) positions in a rest area according to embodiments of the present invention.
Figure 7B:
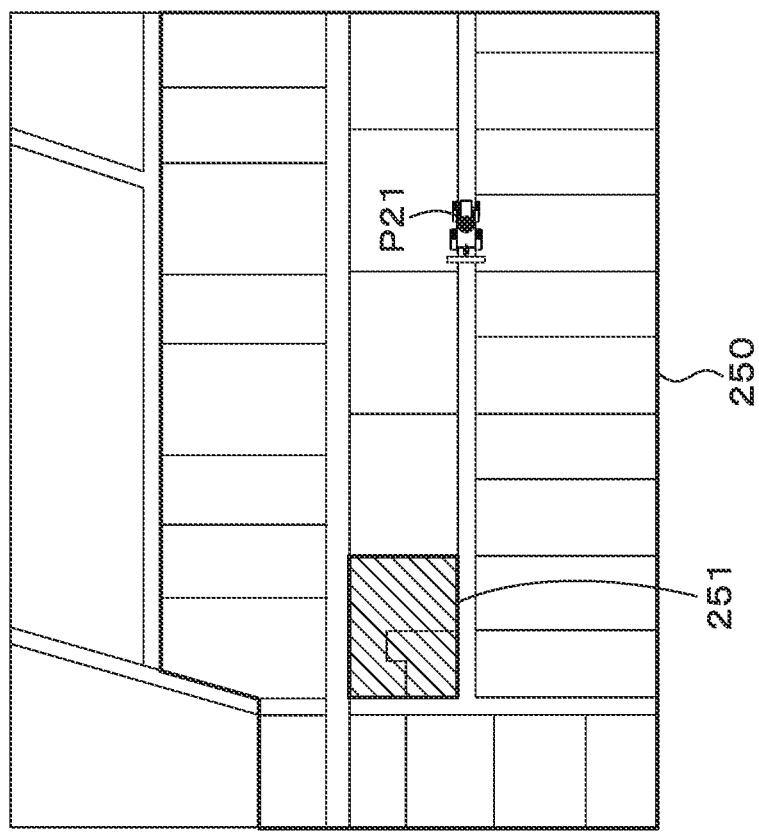
FIG. 7B is a view illustrating a state where a first vehicle position (a working object) positions outside a rest area according to embodiments of the present invention.

As shown in FIG. 7A, the notifier portion 112D does not notify when the first body position P21 is within the rest area 251, and as shown in FIG. 7B, when the first body position P21 is outside the rest area 251, it notifies the stationary computer 105 and the like that the working object 101 is out of the rest area 251.

In the above-described embodiment, the notifier portion 112D determines whether the working object 101 is operating based on the operating information, but the determination of whether the working object 101 is operating is not limited to the method described above. For example, the notifier portion 112D may determine that the working object 101 is operating when the hydraulic pump is being driven. It may also determine that the working object 101 is operating when the ignition key is turned on. Alternatively, a sensor (seat sensor) may be provided to determine whether or not the driver is seated in the operator seat 10, and when the seat sensor detects seating in the operator seat 10, the working object 101 may be judged to be operating, and when the seat sensor does not detect seating in the operator seat 10, the working object 101 may be judged not to be operating.

In other words, the notifier portion 112D provides notification based on whether or not the working object 101 is located in the work area 250 when the working object 101 is operating, and based on whether or not the working object 101 is located in the rest area 251 when the working object 101 is not operating.

The notifier portion 112D supervises the working object 101 by notifying the stationary computer 105 and others whether the working object 101 is in a predetermined area (work area 250, rest area 251) or not.

When the working object 101 is outside the area (work area 250 and rest area 251) for a long period of time, it can be determined that the working object 101 may have been stolen and theft can be prevented by monitoring the working object 101.

Figure 8:
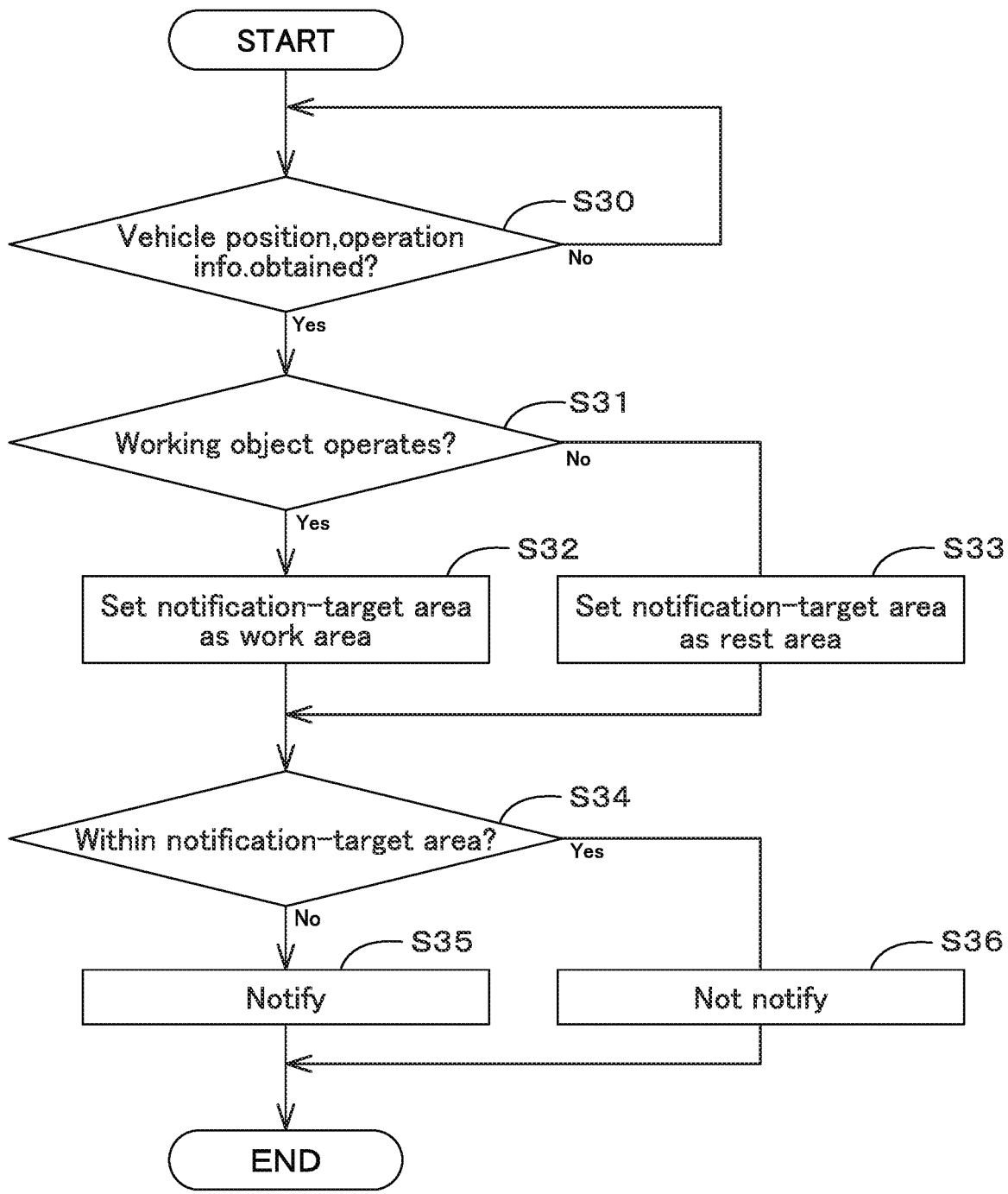
FIG. 8 is a flow chart illustrating a flow of notification of a working object according to embodiments of the present invention.

FIG. 8 is a flowchart of notification of the working object 101.

As shown in FIG. 8, when the work support device (server) 100 obtains the body position (first body position P21) and operating information from the working object 101 (step S30, Yes), the notifier portion 112D determines whether the working object 101 is operating or not (step S31).

When the working object 101 is operating (step S31, Yes), the notifier portion 112D sets the area to be notified (a notification-target area) to the work area 250 (step S32).

When the working object 101 is not operating (step S31, No), the notifier portion 112D sets the area to be notified to the rest area 251 (step S33).

The notifier portion 112D determines whether or not the first body position P21 of the working object 101 is within the area to be notified, and when it is not within the area to be notified (step S34, No), the notifier portion 112D informs the user that the working object 101 is outside the notification area (step S35).

The notifier portion 112D determines whether the first body position P21 of the working object 101 is within the area to be notified, and when it is within the area to be notified (step S34, Yes), the notification of the working object 101 is not made (step S36).

As shown in FIG. 1, the work support device (server) 100 has an area changer portion 113D. The area changer portion 113D includes electrical and electronic circuits in the work support device 100, programs stored in the work support device 100, and the like.

The area changer portion 113D changes the size of the area (work area 250 and rest area 251) based on the number of satellites of the positioning satellite in the signal received by the positioning device 40A (received signal).

Figure 9:
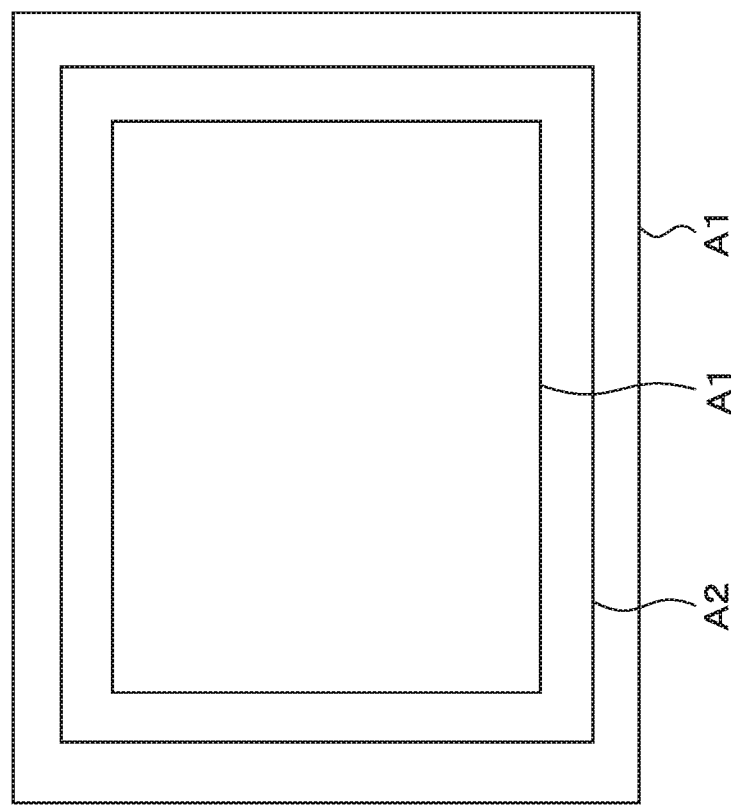
FIG. 9 is a view illustrating a state where a notification target area is changed according to embodiments of the present invention.

As shown in FIG. 9, when the number of satellites capable of receiving a positioning satellite's reception signal (the number of received satellites) is less than a predetermined number (ten reference satellites), the area used for the area to be notified (the area to be notified) A1 will be changed to the area created by the area setter portion 110D (the work area 250, (rest area 251) larger than (work area 250, rest area 251) A2. When the number of satellites of the positioning satellites is greater than a predetermined number, the area A1 used for the area to be notified is made smaller than the area (work area 250, rest area 251) A2.

For example, when the number of received satellites is less than the number of reference satellites, the area changer portion 113D creates the area to be notified A1 by expanding the contour line outward with the center of the created area A2 as it is, when the number of received satellites is less than the number of reference satellites. In addition, when the number of received satellites is equal to or larger than the number of reference satellites, the area changer portion 113D creates the area A1 to be notified by shrinking the contour line outward with the center of the created area A2 as it is, when the number of received satellites is greater than the number of reference satellites.

The area changer portion 113D increases the rate of enlargement of the creation area A2 the smaller the number of received satellites is, and the larger the number of received satellites is, the larger the rate of reduction of the creation area A2. When the number of received satellites is large (the number of received satellites is equal to or larger than the number of reference satellites), the creation area A2 need not be changed, assuming the size of the area A1 to be notified is the same as the creation area A2.

In particular, when the area to be notified is a rest area 251, the area changer portion 113D may change the rest area 251 according to the number of satellites. In other words, the area changer portion 113D changes the size of the rest area 251 when the first body position P21, which is located by the positioning device 40A, is in the rest area 251.

Figure 10:
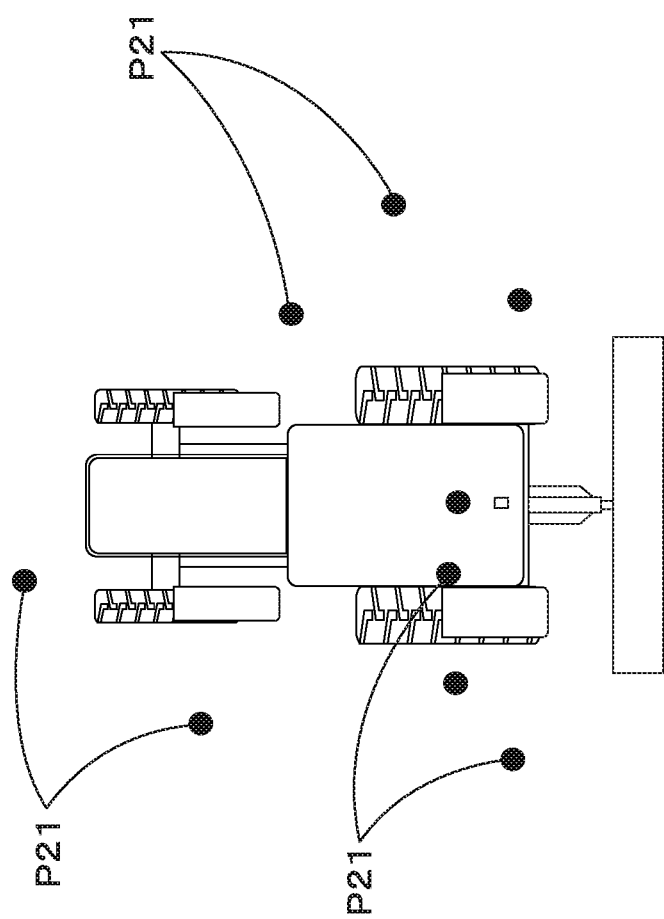
FIG. 10 is a view illustrating a state where a first vehicle position is unstable according to embodiments of the present invention.

Now, in a situation where the first body position P21 is being detected by the positioning device 40A, as shown in FIG. 10, there may be a variation in the first body position P21. In such a case, out of the plurality of first body positions P21, the notifier portion 112D determines whether or not the first body position P21 is in the rest area 251 based on the variation.

In detail, the notifier portion 112D refers to the first body position P21 for a predetermined time, and the first body position P21 where the deviation (degree of variation) of the first body position P21 does not fall within ±2σ or ±3σ is not used to determine the rest area 251.

The work support system is provided with a notifier portion 112D, which notifies about the working object 101 based on whether or not the working object 101 is located in the area, and an area setter portion 110D, which sets as an area a work area 250 when the working object 101 performs work and a rest area 251 when the working object 101 does not perform work.

According to this configuration, it is possible to set the work area 250 when the working object 101 is performing work and the rest area 251 when the working object 101 is not performing work. When the work is being performed, it can be monitored by notification of the notifier portion 112 whether or not it is located in the work area 250, and furthermore, when the work is not being performed, it can be monitored by notification of the notifier portion 112 whether or not it is located in the rest area 251. In other words, the monitoring can be easily performed even when the work is in progress or in pause.

The notifier portion 112D switches an area to be notified in the notifier portion 112D based on the operation information of the working object 101. According to this configuration, the area to be notified can be switched easily depending on the operation of the working object 101, and the monitoring accuracy of the working object 101 can be improved.

The notifier portion 112D switches the area to be notified to the work area 250 when the operating information includes information that the working object 101 is operating, and switches the area to be notified to the rest area 251 when the operating information includes information that the working object 101 is not operating.

According to this configuration, when the working object 101 is operating, it is considered to be working, and when the working object 101 is not operating, it is considered to be idle and not working, and the area can be easily switched.

For example, when the working object 101 is located in a work area (work area 250), it is often operated and working, and when the working object 101 is located in a storage area such as a barn (rest area 251), it is often stopped and stored, so that it can be easily switched between the work area 250 and the rest area 251.

The working object 101 is an industrial machine provided with a prime mover, and when the prime mover is shut down, the area to be notified in the notifier portion 112D is changed from the work area 250 to the rest area 251.

According to this configuration, when the prime mover is shut down, it can be easily switched to the rest area 251, taking advantage of the fact that no work can be performed by the working object 101.

The work support system has a positioning device 40A for positioning the position of the working object 101 based on the signals of the positioning satellite, and an area changer portion 113D that changes the size of the resting area 251 according to the status of the positioning satellite when the position of the working object 101 is within the resting area 251 by the positioning device 40A.

According to this configuration, for example, in a situation where a rest area 251 is set up in a storage area such as a barn and the stopped working object 101 is being monitored, even when the condition of the positioning satellite is not good and the error of the positioning device 40A is large, the extra notification by the notifier portion 112A can be reduced.

The work support system has a positioning device 40A for positioning a position of a working object 101 based on a signal of a positioning satellite, a notifier portion 112D for notifying about the working object 101 based on whether the position of the working object 101 as positioned by the positioning device 40A is in the area or not, and an area changer portion 113D for changing the size of the area based on the number of satellites of the positioning satellite in the signal received by the positioning device 40A.

According to this configuration, the size of the area is changed according to the number of satellites, that is, the accuracy of the detection of the position of the positioning device 40A, so that the system of monitoring can be improved by reducing unnecessary notifications, even when the working object 101 is located near the boundary of the area.

The area changer portion 113D enlarges the area when the number of satellites of the positioning satellites is less than a predetermined number, and reduces the area when the number of satellites of the positioning satellites is greater than a predetermined number.

According to this configuration, since the positioning accuracy of the positioning device side device 40A decreases when the number of satellites is small, the number of notifications can be reduced by enlarging the area, even when the working object 101 is located near the boundary of the area and does not move. In addition, since the positioning accuracy of the positioning device side device 40A improves when there are a large number of satellites, the area can be made smaller for more precise monitoring.

The work support system has an area setter portion 110D that sets the work area 250 when the working object 101 performs work and the resting area 251 when the working object 101 does not perform work as an area, and when the position of the working object 101 as measured by the positioning device 40A is within the resting area 251, the size of the area is changed.

According to this configuration, when the rest area 251 is set up to include a storage area, such as a barn, for example, the accuracy of monitoring the working object 101 can be increased by changing the area.

The notifier portion 112D uses the variation in the position of the working object 101 as measured by the positioning device 40A to determine whether the position of the working object 101 is in the area or not.

According to this configuration, the monitoring accuracy can be improved by determining when the position measured by the positioning device 40A is stable, that is, when it is a position with little variation.

In the above-described embodiment, the working object (industrial machine) 101 is described using an agricultural machine (tractor) as an example, but it may also be an implement connected to the tractor.

Figure 11:
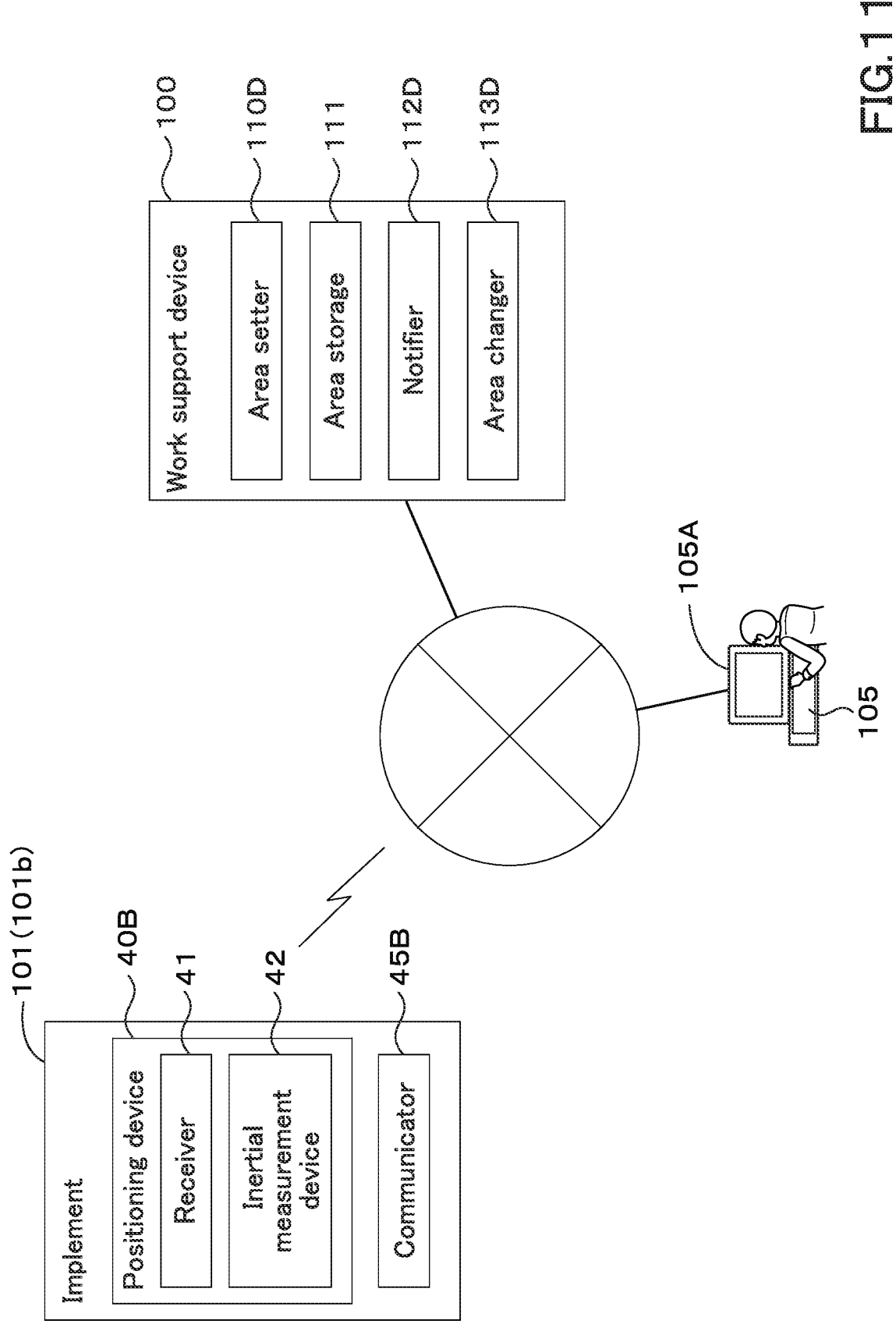
FIG. 11 is a view illustrating a modified example of a work support system according to embodiments of the present invention.

As shown in FIG. 11, the implement is provided with a positioning device 40B. The positioning device 40B has the same configuration as the positioning device 40A. That is, the positioning device 40B receives a satellite signal (such as a position of the positioning satellite, a transmission time, correction information, and the like) transmitted from the positioning satellite and detects a position (for example, latitude and longitude) based on the satellite signal. The positioning device 40B, like the positioning device 40A, also has a receiver device 41 and an inertial measurement unit 42, and the position is obtained by the receiver device 41 and the inertial measurement unit 42.

The implement is provided with a communicator device 45B. The communicator device 45B is capable of communicating with an external network (external) that is different from the in-vehicle network N1. The communicator device 45B, for example, is capable of communicating with IEEE 802.11 series Wi-Fi (Wireless Fidelity, registered trademark), BLE (Bluetooth (registered trademark) Low Energy), LPWA (Low Power, Wide Area), LPWAN (Low-Power Wide-Area Network), and the like.

The communicator device 45B can, for example, communicate wirelessly by means of a cellular telephone communication network or a data communication network. The communicator device 45B transmits the body position (position of the working object 101) and operation information detected by the positioning device 40B to the work support device 100.

In a modified example of FIG. 11, the operation of the implement and the communicator device 45B is not explained because the tractor described above can be read as "implement" and the communicator device 45B can be read as "communicator device 45A".

Second Embodiment

FIG. 11 shows a work support system. The work support system is provided with a work support device 100. The work support device 100 is a device that supports a plurality of working objects 101 and the like. The plurality of working objects 101 include agricultural machine 101a such as a tractor, a combine, a rice transplanter, and the like, and an implement 101b that can be connected to the agricultural machine 101a.

The work support device 100 is a stationary computer, such as a server, or a portable computer, such as a smart phone, tablet, laptop, or the like. In this embodiment, the description of the work support device 100 will proceed, assuming that the work support device 100 is a server.

FIG. 30 shows a side view of a tractor, one of the agricultural machines 101a, and the implement 101b that can be attached to the tractor.

In the embodiment of the present invention, the front side of an operator seated on the operator seat 10 of the tractor is referred to as the front, the rear side of the operator is referred to as the rear, the left side of the operator is referred to as the left, and the right side of the operator is referred to as the right. In addition, the horizontal direction, which is a direction orthogonal to the front-rear direction, will be described as the machine width direction.

As shown in FIG. 30, the tractor is provided with the vehicle body 3, the prime mover 4, and the speed-shifter device 5. The vehicle body 3 has the traveling device 7, which is capable of traveling. The traveling device 7 is a device having a front wheel 7F and a rear wheel 7R. The front wheels 7F may be of the tire type or crawler type. The rear wheels 7R may also be of the tire type or crawler type.

The prime mover 4 includes a diesel engine, an electric motor or the like, which in this embodiment is a diesel engine. The speed-shifter device 5 is capable of switching the propulsion power of the traveling device 7 by shifting gears and of switching the traveling device 7 forward or backward. The vehicle body 3 is provided with the operator seat 10.

At the rear portion of the vehicle body 3, a coupling portion consisting of a three-point linkage mechanism or the like is provided. The coupling portion is a lifter device 8 which can attach and detach the working machine (implement) 101b and which can pull the working machine (implement) 101b. By connecting the implement 101b to the lifter device 8, the implement 101b can be towed by the vehicle body 3. The connection may be a pulling device that does not raise or lower the implement 101b.

The implement is a cultivating device for cultivating, a ridging device for ridging, a planting device for planting crops, a fertilizer sprayer device for spraying fertilizer, a pesticide sprayer device for spraying pesticides, a harvester device for harvesting, a mower device for harvesting pasture or the like, a tedder device for diffusing pasture or the like, a grass rake device for collecting pasture or the like, and a baler device for molding pasture or the like.

Figure 13:
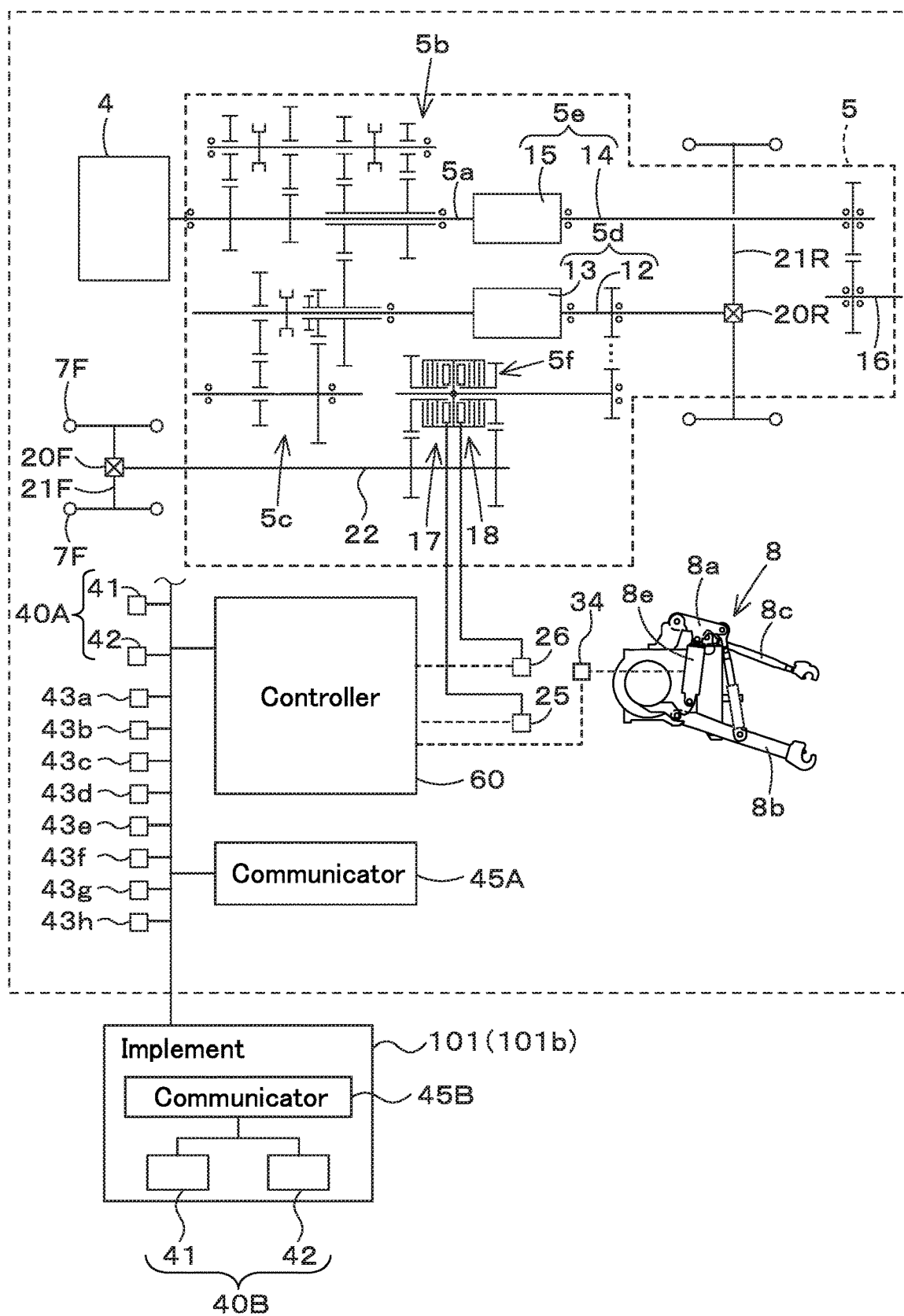
FIG. 13 is a view illustrating a control block diagram according to embodiments of the present invention.

As shown in FIG. 13, the speed-shifter device 5 is provided with the main shaft (propulsion shaft) 5a, the main shifter portion 5b, the sub shifter portion 5c, the shuttle portion 5d, the PTO power transmission portion 5e, and the front shifter portion 5f. The propulsion shaft 5a is rotatably supported in the housing case (mission case) of the speed-shifter device 5, and power from the crankshaft of the prime mover 4 is transmitted to the propulsion shaft 5a.

The main shifter portion 5b has a plurality of gears and a shifter for changing the engagements of the gears. The main transmission 5b modifies the rotation input from the propulsion shaft 5a and outputs (shifts the speed) by changing the connection (engagement) of the plurality of gears by the shifter as appropriate.

The sub shifter portion 5c, like the main shifter portion 5b, has a plurality of gears and a shifter for changing the engagements of the gears. The sub shifter portion 5c modifies the rotation input from the main shifter portion 5b and outputs (shifting gears) by changing the connection (engagement) of the plurality of gears with the shifter accordingly.

The shuttle portion 5d has the shuttle shaft 12 and the forward/backward switching portion 13. The power output from the sub shifter portion 5c is transmitted to the shuttle shaft 12 via a gear or the like. The forward/backward switching portion 13 includes, for example, a hydraulic clutch or the like, and switches the direction of rotation of the shuttle shaft 12, that is, forward and backward movement of the tractor, by turning the hydraulic clutch on and off. The shuttle shaft 12 is connected to the rear wheel differential device 20R. The rear wheel differential device 20R rotatably supports the rear axle 21R to which the rear wheels 7R are attached.

The PTO power transmission portion 5e has a PTO propulsion shaft 14 and a PTO clutch 15. The PTO propulsion shaft 14 is rotatably supported and is capable of transmitting power from the propulsion shaft 5a. The PTO propulsion shaft 14 is connected to the PTO shaft 16 via a gear or the like. The PTO clutch 15 includes, for example, a hydraulic clutch or the like, and is switched between a state in which the power of the propulsion shaft 5a is transmitted to the PTO propulsion shaft 14 and a state in which the power of the propulsion shaft 5a is not transmitted to the PTO propulsion shaft 14 by turning the hydraulic clutch on and off.

The front shifter portion 5f has a first clutch 17 and a second clutch 18. The first clutch 17 and the second clutch 18 are capable of transmitting power from the propulsion shaft 5a, for example, the power of the shuttle shaft 12 is transmitted through the gears and the transmission shaft. The power from the first clutch 17 and the second clutch 18 can be transmitted to the front axle 21F via the front transmission shaft 22. In particular, the front transmission shaft 22 is connected to the front wheel differential device 20F, and the front wheel differential device 20F rotatably supports the front axle 21F to which the front wheels 7F are mounted.

The first clutch 17 and the second clutch 18 include a hydraulic clutch or the like. An fluid line is connected to the first clutch 17, and the fluid line is connected to a first operation valve 25, to which hydraulic fluid discharged from the hydraulic pump is supplied. The first clutch 17 is switched between a connected state and a disconnected state depending on the degree of opening of the first operation valve 25.

An fluid line is connected to the second clutch 18, and the fluid line is connected to the second operation valve 26. The second clutch 18 is switched between a connected state and a disconnected state depending on the degree of opening of the second operation valve 26. The first and second operation valves 25 and 26 are, for example, two-position switching valves with solenoid valves, which are switched to a connected or disconnected state by excitation or demagnetization of the solenoid valve solenoids.

When the first clutch 17 is disconnected and the second clutch 18 is connected, the power of the shuttle shaft 12 is transmitted to the front wheels 7F through the second clutch 18. This results in four-wheel drive (4WD) in which the front wheels 7F and the rear wheels 7R are driven by the power, and the rotation speeds of the front wheels 7F and the rear wheels 7R are approximately the same (4WD constant speed state).

On the other hand, when the first clutch 17 is connected and the second clutch 18 is disconnected, four-wheel drive is provided and the rotational speed of the front wheels 7F becomes higher than that of the rear wheels 7R (4WD accelerating speed state). When the first clutch 17 and the second clutch 18 are disconnected, the power of the shuttle axle 12 is not transmitted to the front wheels 7F, and therefore the rear wheels 7R become two-wheel drive (2WD) driven by the power.

Figure 14:
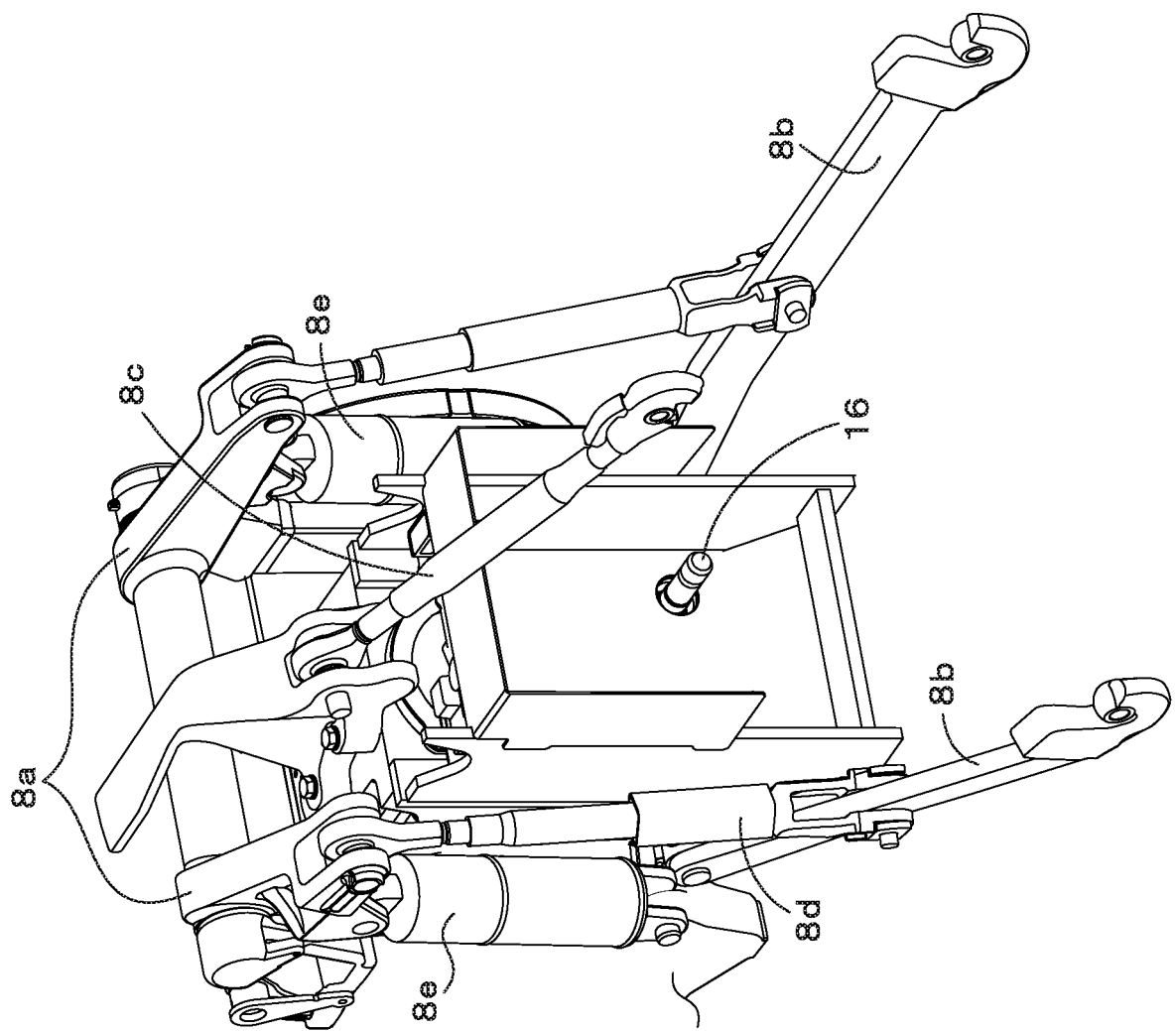
FIG. 14 is a view illustrating a lifter device according to embodiments of the present invention.

As shown in FIG. 14, the lifter device 8 has a lift arm 8a, a lower link 8b, a top link 8c, a lift rod 8d, and a lift cylinder 8e. The front end of the lift arm 8a is pivotally supported upwardly or downwardly in the upper rear portion of the case (transmission case) housing the speed-shifter device 5.

The lift arm 8a is pivoted (raised or lowered) by the drive of the lift cylinder 8e. The lift cylinder 8e includes a hydraulic cylinder. The lift cylinder 8e is connected to a hydraulic pump via a control valve 34. The control valve 34 is a solenoid valve or the like, which extends and shortens the lift cylinder 8e.

The front end of the lower link 8b is pivotally supported upwardly or downwardly in the rear lower portion of the speed-shifter device 5. The front end of the top link 8c is pivotally supported upwardly or downwardly on the rear portion of the speed-shifter device 5 above the lower link 8b. A lift rod 8d connects the lift arm 8a to the lower link 8b. An implement 101b is connected to the rear portion of the lower link 8b and to the rear portion of the top link 8c.

When the lift cylinder 8e is driven (telescoping), the lift arm 8a is raised and lowered, and the lower link 8b connected to the lift arm 8a via the lift rod 8d is raised and lowered. This causes the implement 101b to pivot upwardly or downwardly (raise or lower) with the front part of the lower link 8b as a fulcrum.

As shown in FIG. 13, the tractor is provided with a positioning device 40A. The positioning device 40A is capable of detecting its own position (positioning information including latitude and longitude) by a satellite positioning system (positioning satellites) such as D-GPS, GPS, GLONASS, HOKUTO, GALILEO, MICHIBIKI, and the like. That is, the positioning device 40A receives satellite signals transmitted by the positioning satellite (such as the position of the positioning satellite, transmission time, correction information, and the like) and detects its position (for example, latitude and longitude) based on the satellite signals.

The positioning device 40A has a receiver device 41 and an Inertial Measurement Unit (IMU) 42. The receiver device 41 has an antenna or the like and receives satellite signals transmitted from a positioning satellite, and is attached to the vehicle body 3 separately from the inertial measurement unit 42.

In this embodiment, the receiver device 41 is mounted in the cabin 9, which is installed in the vehicle body 3. The mounting point of the receiver device 41 is not limited to the embodiment.

The inertial measurement unit 42 has an acceleration sensor to detect acceleration, a gyroscope to detect angular velocity, and the like. The vehicle body 3, for example, is installed below the operator seat 10, and the roll angle, pitch angle, yaw angle, and the like of the vehicle body 3 can be detected by the inertial measurement unit 42.

As shown in FIG. 13, the tractor is provided with a communicator device 45A. The communicator device 45A is capable of communicating with an external network (external) that is different from the on-board network N1. The communicator device 45A, for example, is capable of communicating with the IEEE 802.11 series Wi-Fi (Wireless Fidelity, registered trademark), BLE (Bluetooth (registered trademark) Low Energy), LPWA (Low Power, Wide Area), LPWAN (Low- Power Wide-Area Network), and the like.

The communicator device 45A can communicate wirelessly, for example, by means of a cellular telephone communication network or a data communication network. The communicator device 45A transmits the body position (position of the tractor) detected by the positioning device 40A to the work support device 100.

As shown in FIG. 13, the tractor is provided with a controller device 60. The controller device 60 is a device for controlling the driving system and computing the control of the work system in the tractor.

When the shuttle lever 43a, which switches the vehicle body 3 forward or backward, is operated to forward, the controller device 60 causes the vehicle body 3 to move forward by switching the forward/backward switching portion 13 to forward. When the shuttle lever 43a is operated in the backward direction, the controller device 60 switches the forward/backward switching portion 13 to backward to move the vehicle body 3 backward.

When the ignition switch 43b is operated to ON, the controller device 60 starts the prime mover 4 through a predetermined process, and when the ignition switch 43b is operated to OFF, the drive of the prime mover 4 is stopped. When the PTO transmission lever 43c is operated, the controller device 60 changes the number of revolutions of the PTO shaft (referred to as the PTO speed) by switching the PTO transmission gear incorporated in the speed-shifter device 5.

When the speed-shifter switch 43d is switched to automatic transmission, the controller device 60 automatically switches either the main shifter portion 5b or the sub shifter portion 5c according to the condition of the tractor, and automatically changes the gear shift (transmission level) of the speed-shifter device 5 to a predetermined gear shift (transmission level).

When the speed-shifter switch 43d is switched to manual transmission, the controller device 60 automatically switches one of the main shifter portion 5b and the sub shifter portion 5c in accordance with the gear shift level (gear shift level) set by the gear shift lever 43e, and changes the gear shift level of the speed-shifter device 5.

When the accelerator 43f is operated, the controller device 60 changes the speed (speed) of the vehicle body 3 by changing the number of revolutions of the prime mover 4 (referred to as the prime mover speed) according to the amount of operation of the accelerator 43f. When the one-touch switch 43g is operated in the direction of raising the one-touch switch 43g (the upward side), the controller device 60 extends the lift cylinder 8e by controlling the control valve 34 to raise the rear end portion of the lift arm 8a (the end portion of the implement 101b side).

When the one-touch switch 43g is operated in the direction of lowering (downward side), the controller device 60 contracts the lift cylinder 8e by controlling the control valve 34 to lower the rear end portion of the lift arm 8a (the end portion of the implement 101b side).

The controller device 60 stops the raising operation in the lifter device 8 when the position of the implement 101b, that is, the angle of the lift arm 8a reaches the upper limit (the upper height limit) set by the upper limit setting dial 43h, when the implement 101b is raised by the lifter device 8.

As shown in FIG. 13, the implement 101B is provided with a positioning device 40B. The positioning device 40B has the same configuration as the positioning device 40A. That is, the positioning device 40B receives a satellite signal (such as a position of a positioning satellite, a transmission time, correction information, and the like) transmitted from the positioning satellite and detects a position (for example, latitude and longitude) based on the satellite signal.

The positioning device 40B, like the positioning device 40A, also has a receiver device 41 and an inertial measurement unit 42, and the position is obtained by the receiver device 41 and the inertial measurement unit 42.

The implement 101B is provided with a communicator device 45B. The communicator device 45B is capable of communicating with an external network (outside) that is different from the on-board network N1. The communicator device 45B, for example, is capable of communicating with IEEE 802.11 series Wi-Fi (Wireless Fidelity, registered trademark), BLE (Bluetooth (registered trademark) Low Energy), LPWA (Low Power, Wide Area), LPWAN (Low-Power Wide-Area Network), and the like.

The communicator device 45B can communicate wirelessly, for example, by means of a cellular telephone communication network or a data communication network. The communicator device 45B transmits the body position (the position of the implement 101b) detected by the positioning device 40B to the work support device 100.

Figure 12:
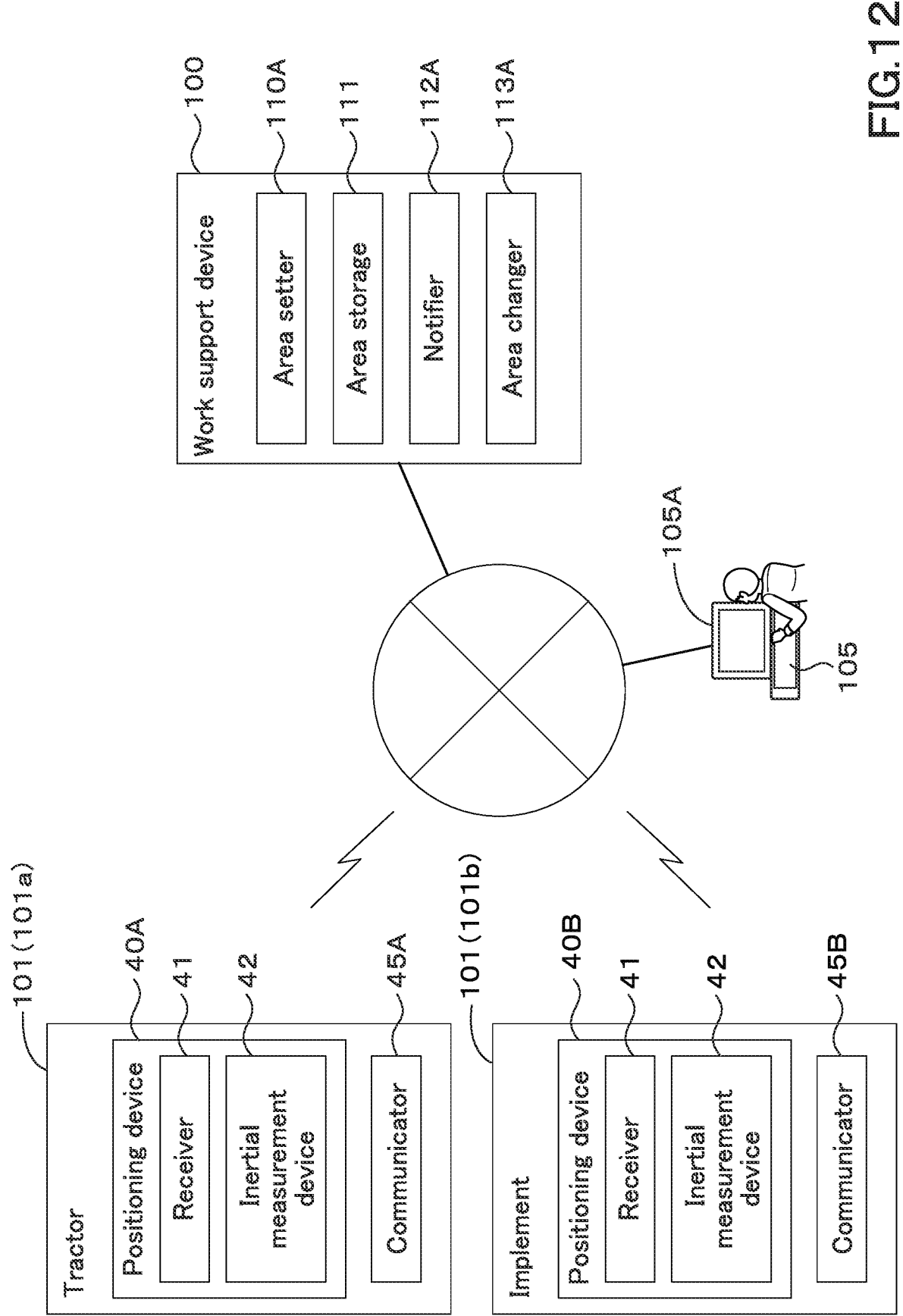
FIG. 12 is a view illustrating a work support system.

As shown in FIG. 12, the work support device (server) 100 has an area setter portion 110A and an area storage portion 111. The area setter portion 110A includes an electrical and electronic circuit in the work support device 100, a program stored in the work support device 100, and the like. The area storage portion 111 includes a non-volatile memory or the like.

Figure 15:
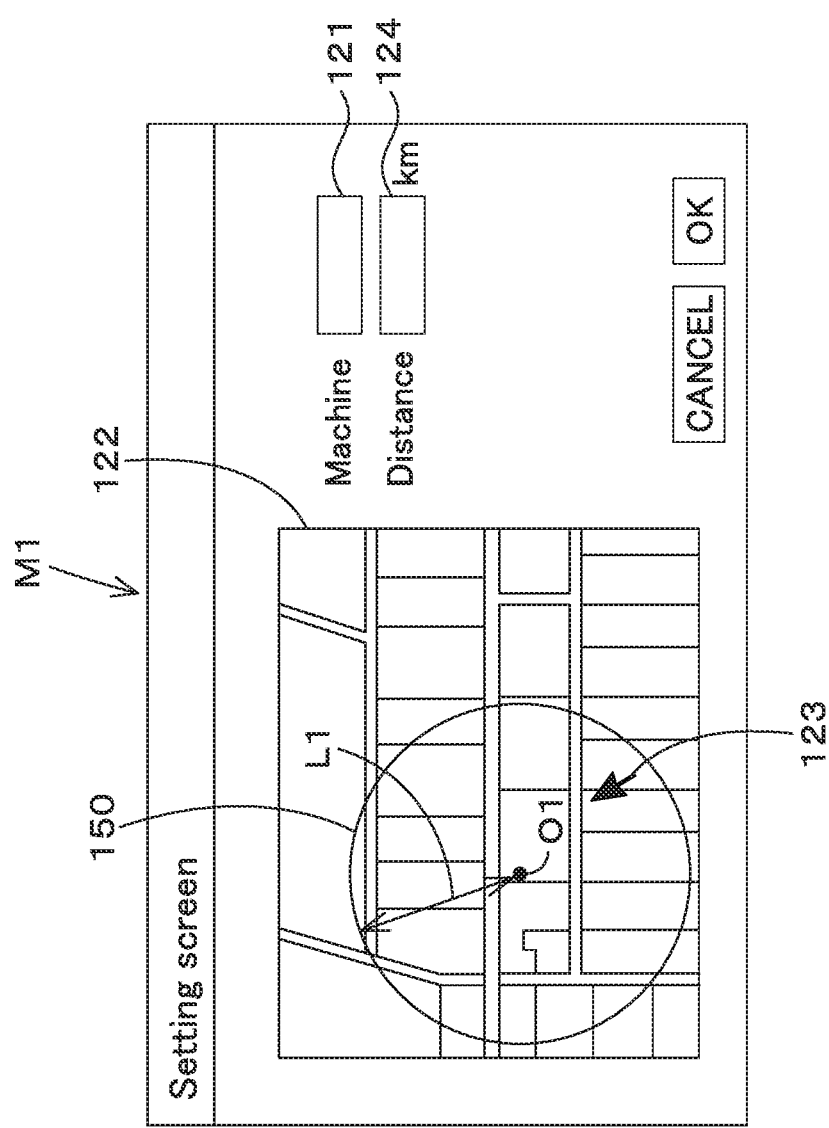
FIG. 15 is a view illustrating an example of a setting screen M10 according to embodiments of the present invention.

The area setter portion 110A sets an area 150 for each of the plurality of working objects 101. In particular, as shown in FIG. 12, when an stationary computer 105, which is different from the work support device (server) 100, is connected to the work support device (server) 100 and a predetermined operation is performed on the stationary computer 105, as shown in FIG. 15, the display portion 105A such as a monitor of the stationary computer 105 displays the setting screen M1.

The setting screen M1 includes a working object input portion 121 for entering the working object 101, a map display portion 122 for displaying a map, a pointer 123 for selecting any point on the map, and a distance input portion 124 for entering a distance. The working object input portion 121 can input identification information that identifies the working object 101. The identifying information can be various information such as a serial number, name, model number, model number, and serial number of the working object 101.

The map display portion 122 is a portion that displays a map including roads, farm roads, fields and other work areas, buildings and the like. The map displayed on the map display portion 122 may be, for example, a map obtained from a map provider who provides data for the map, or may be a map created by the stationary computer 105 or the like, but is not limited thereto.

The pointer 123 is capable of selecting any point on the map display 122, and when any point is selected, the area setter portion 110A sets, for example, a position on the selected map (latitude and longitude) as the center O1 of the area 150. A distance L1 can be entered into the distance input portion 124.

When the center O1 of the area 150 is set and the distance L1 is input to the distance input portion 124, the area setter portion 110A sets a position that is separated from the center O1 by a distance L1 as a boundary of the area 150. That is, the area setter portion 110A sets any position displayed on the map display portion 122 as the center O1 of the area 150, and sets the area 150 at a distance L1 away from the center O1 by a distance L1.

When the decision button 114 is selected in the setting screen M1, the area setter portion 110A sets the area 150 for the working object 101, that the center O1 and the distance L1 of the area 150 correspond to the identification information (working object identification information) entered in the working object input portion 121, and the area 150 is set for the working object 101. For convenience of explanation, the area 150 set with respect to the working object 101 may be referred to as the area.

In the setting screen M1, the area 150 can be set for each plurality of working objects 101 by repeating the input of the working object identification information, the center O1 and the distance L1. In the above-described embodiment, the center of the area 150 is selected by the pointer 123, but a plurality of positions (points) on the map may be selected by the pointer 123. In this case, the area setter portion 110A sets the area surrounded by the plurality of positions (points) to the area 150.

As shown in FIG. 16, the area information (working object identification information and information indicating the area 150) set by the area setter portion 110A is stored in the area storage portion 111. The area information shown in FIG. 16 is an example and is not limited to the area information shown in FIG. 16.

The work support device (server) 100 has a notifier portion 112A. The notifier portion 112A includes electrical and electronic circuits in the work support device 100, a program stored in the work support device 100, and the like.

Figure 17A:
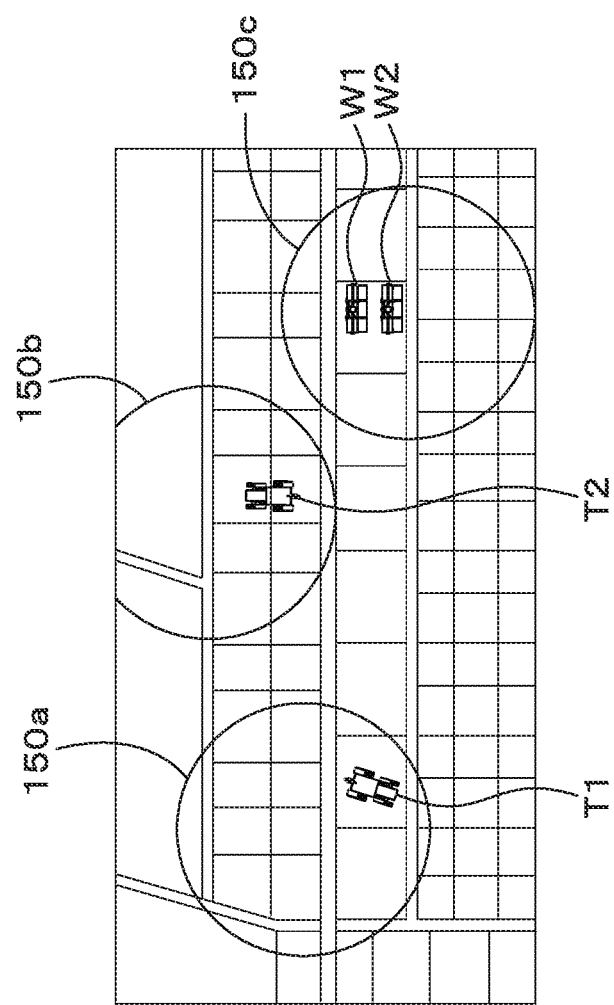
FIG. 17A is a view illustrating an example of an area set corresponding to a tractor and an implement according to embodiments of the present invention.

The notifier portion 112A is based on whether or not the working object 101 is located in the area 150 defined for the working object 101. As shown in FIG. 17A, suppose that area 150 of the first tractor T1 is "area 150a" and the area 150 of the second tractor T2 is "area 150b" among the tractors. Also, as shown in FIG. 17A, suppose that the area 150 of the first and second implement W1 and the area 150 of the second implement W2 is "area 150c" of the implement 101b.

When the notifier portion 112A receives the body position of the first tractor T1 (the first body position) by the work support device (server) 100, the notifier portion 112A determines whether the first body position is within the area 150a or not. When the first body position is within the area 150a, the notifier portion 112A does not notify the user, and when the first body position is outside the area 150a, the notifier portion 112A notifies the stationary computer 105 or the like that the first tractor T1 is out of the area 150a.

Similarly, when the body position of the second tractor T2 (the second body position) is received by the work support device (server) 100, the notifier portion 112A determines whether or not the second body position is within the area 150b. When the second body position is within the area 150b, the notifier portion 112A does not notify the second body position, and when the second body position is outside the area 150b, the notifier portion 112A notifies the stationary computer 105 or the like that the second tractor T2 is out of the area 150b.

When the notifier portion 112A receives the body position (third body position) of the first implement W1 (the third body position) by the work support device (server) 100, the notifier portion 112A determines whether or not the third body position is within the area 150c. When the third body position is within the area 150c, the notifier portion 112A does not notify the third body position, and when the third body position is outside the area 150c, the notifier portion 112A notifies the stationary computer 105 and the like that the first implement W1 is out of the area 150c.

The notifier portion 112A refers to the fourth body position of the second implement W2 as well as the first implement W1, and when the fourth body position is outside the area 150c, the notifier portion 112A notifies the stationary computer 105 and others that the second implement W2 is out of the area 150c.

In other words, the notifier portion 112A supervises the working object 101 by notifying the stationary computer 105 and the like whether the working object 101 is in the area 150 defined in correspondence with the working object 101 or not. When the working object 101 is outside the area 150 for a long period of time, it can be determined that the working object 101 may have been stolen, and theft prevention can be carried out by monitoring the working object 101.

As described above, according to the notifier portion 112A, it is possible to notify whether or not the working object 101, such as a tractor, is located within the area 150 set for the tractor, or whether or not a working object 101, such as the implement 101b, is located within the area 150 set for the implement 101b.

Now, the work support device (server) 100 has an area changer portion 113A. The area changer portion 113A includes electrical and electronic circuits in the work support device 100, programs stored in the work support device 100, and the like.

The area changer portion 113A changes the area of the non-corresponding working object (a second area) to the area corresponding to the corresponding working object (a first area) when the non-corresponding working object, which is a different working object from the corresponding working object, is located in the area (the first area) that corresponds to the corresponding working object, which is a predetermined working object.

Figure 17B:
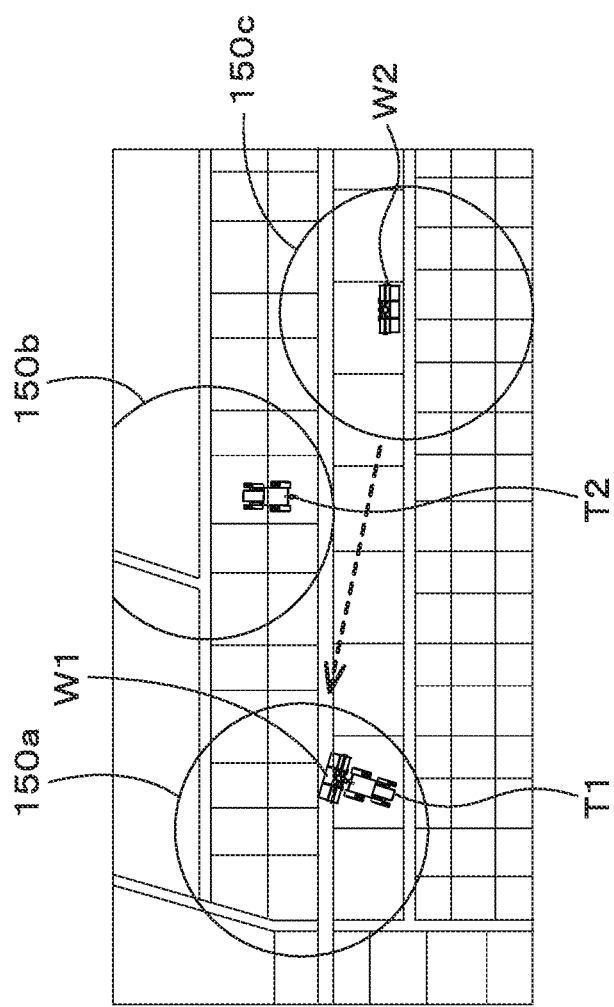
FIG. 17B is a view illustrating an example where an implement moves to an area of a first tractor according to embodiments of the present invention.

As shown in FIG. 17B, for example, when the first tractor T1 is the corresponding working object, when, for example, the first implement W1 or the like, which is different from the first tractor T1, is located in the area 150a corresponding to the first tractor T1, the area changer portion 113A changes the area 150c of the first implement W1 to the area 150a corresponding to the first tractor T1.

In other words, in a situation where area 150c is set as an area for the first implement W1, when the first implement W1 is located in area 150a of the first tractor T1, the area changer portion 113A changes the area of the first implement W1 from area 150c to area 150a.

In more detail, when the first implement (non-corresponding working object) W1, which is placed in area 150c, is moved to area 150a of the first tractor (corresponding working object) T1, and the first implement (non-corresponding working object) W1 is connected to the first tractor (corresponding working object) T1, the area changer portion 113A changes the area of the first implement (non-corresponding working object) W1 from area 150c to the area 150a.

Figure 18:
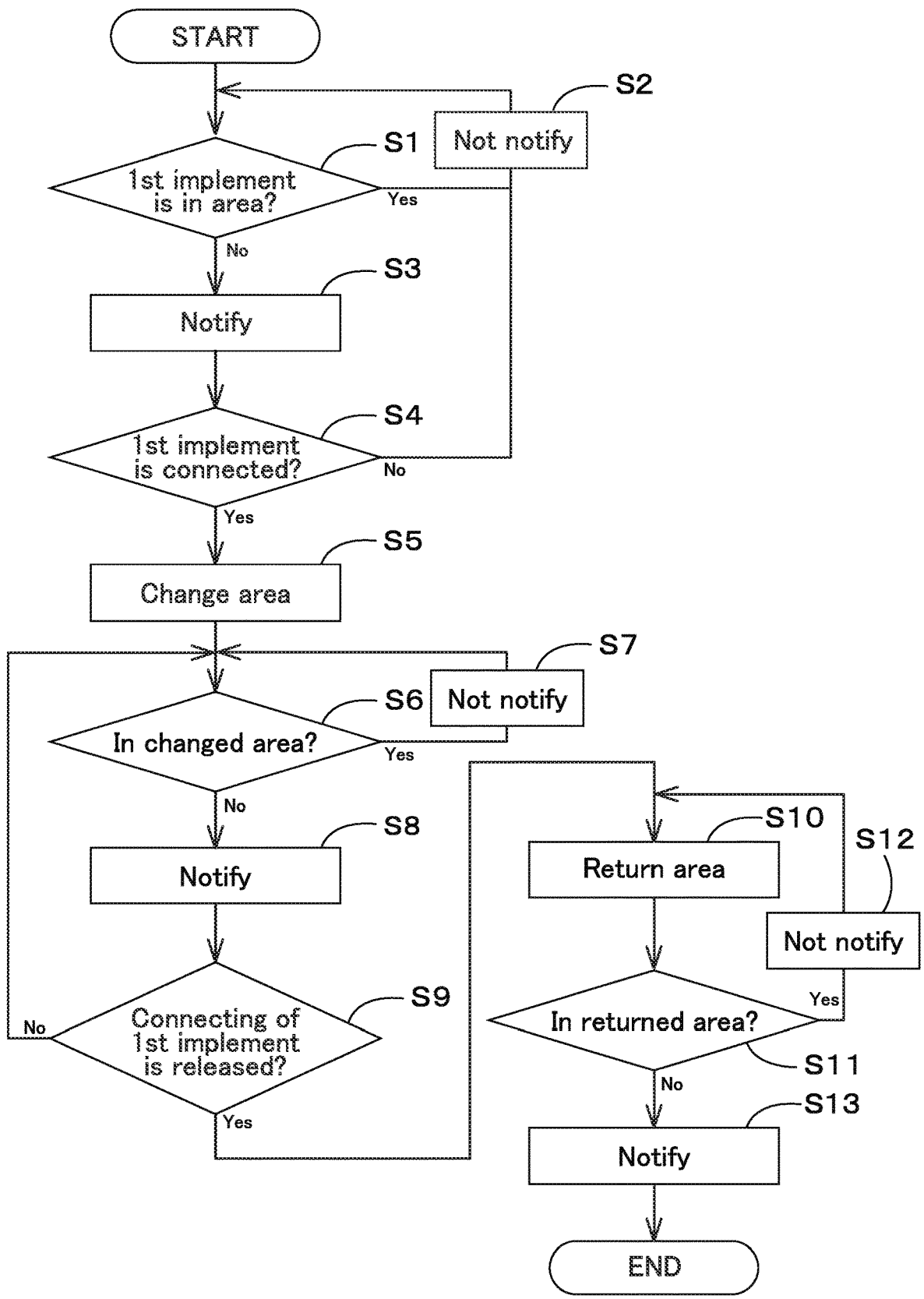
FIG. 18 is a view illustrating an operation flow of an operation to move a first implement to an area of a first tractor according to embodiments of the present invention.
Figure 19:
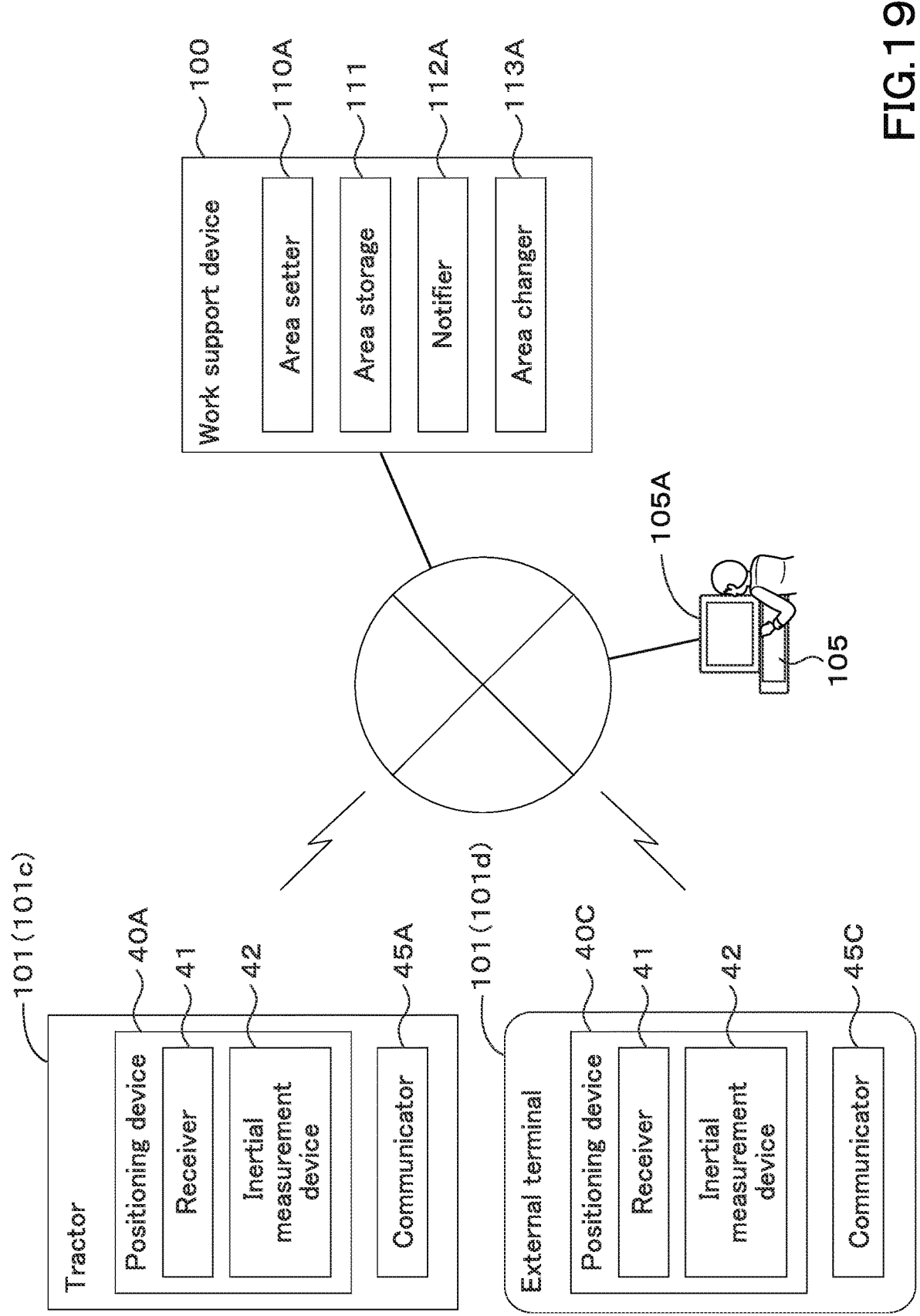
FIG. 19 is a view illustrating a modified example of a work support system according to embodiments of the present invention.

FIG. 18 is an operation flow showing the operation of moving the first implement W1 to the area 150a of the tractor T1.

As shown in FIG. 18, when the first implement W1 is located within the area (self area) 150c, which is its own area (step S1, Yes), the notifier portion 112A does not notify (step S2).

When the first implement W1 is outside the self area 150C (step S1, No), the notifier portion 112A makes a notification (step S3).

When the first implement W1 is connected to the first tractor T1 after the first implement W1 enters the area 150a of the first tractor T1 (step S4, Yes), the area changer portion 113A changes the area (self area) 150c of the first implement W1 to the area 150a (step S5).

When the first tractor T1 is coupled to the first implement W1, the first tractor T1 obtains the identification information stored in the first implement W1 from the in-vehicle network or the like, and transmits the identification information to the work support device (server) 100 via the communicator device 45A. This enables the work support device (server) 100 to understand that the first implement W1 has been coupled to the first tractor T1.

When the area (self area) 150c of the first implement W1 has been changed to area 150a and the first implement W1 is located in the changed area 150a (step S6, Yes), the notifier portion 112A does not issue notification (step S7).

When the first implement W1 is outside the modified area 150A (step S6, No), the notifier portion 112A issues a notification (step S8).

When the connection of the first implement W1 to the first tractor T1 is uncoupled (step S9, Yes), that is, when the first implement W1 is removed from the first tractor T1, the area changer portion 113A returns the area of the first implement W1 (self area) 150a to the area 150c (step S10).

When, after returning the area (self area) 150a of the first implement W1 to area 150c, the first implement W1 is located in area (self area) 150c (step S11, Yes), the notifier portion 112A does not notify the user (step S12).

When the first implement W1 is outside the self area 150C (step S11, No), the notifier portion 112A issues a notification (step S13).

Figure 20A:
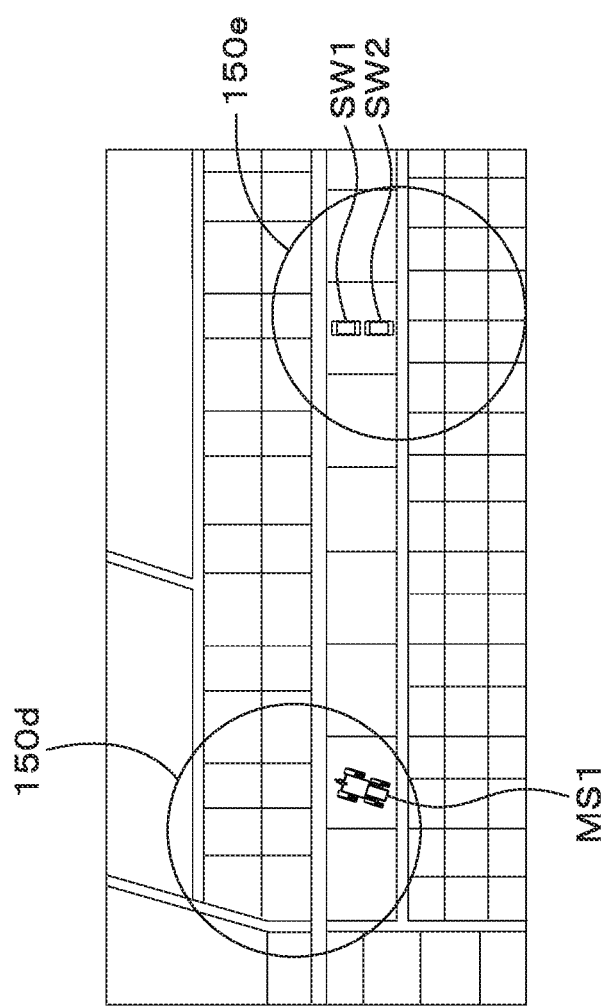
FIG. 20A is a view illustrating an example of an area set corresponding to an industrial machine and an external terminal according to embodiments of the present invention.
Figure 20B:
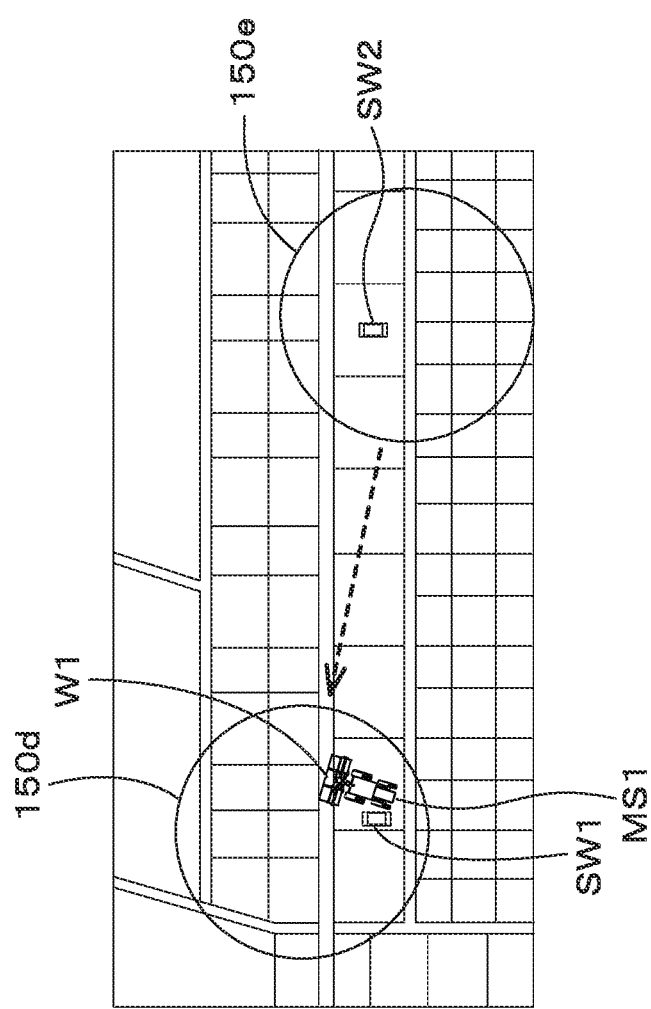
FIG. 20B is a view illustrating an example where an external terminal moves to an area of a first industrial machine according to embodiments of the present invention.

In the above embodiment, the plurality of working objects 101 included agricultural machine 101a and implements 101b. However, instead, as shown in FIGS. 20A and 20B, it may be an industrial machine 101c, such as an agricultural machine or construction machine, and an external terminal 101d assigned to a worker operating the industrial machine 101c. In this case, the tractor can be read as the industrial machine 101c and the implement 101b can be read as the external terminal 101d.

The external terminal 101d is a portable computer such as a smartphone, tablet, laptop, or other portable computer. The external terminal 101d is provided with a positioning device 40C and a communicator device 45C. The positioning device 40C is similar to the positioning devices 40A and 40B and detects the position of the terminal (terminal position). The communicator device 45C is the same as the communicator devices 45A and 45B.

As shown in FIG. 20A, suppose that the area 150 of the first industrial machine MS1 is "area 150d" and the area 150 of the first external terminal SW1 and the second external terminal SW2 is "area 150e" among the industrial machines 101c, as shown in FIG. 20A.

When the notifier portion 112A receives the vehicle body position (fifth body position) of the first industrial machine MS1 (fifth body position) by the work support device (server) 100, the notifier portion 112A determines whether the fifth body position is within the area 150d or not. When the fifth body position is within the area 150d, the notifier portion 112A does not notify the user when the fifth body position is within the area 150d, and when the fifth body position is outside the area 150d, the notifier portion 112A notifies the stationary computer 105 or the like that the first industrial machine MS1 is out of the area 150d.

When the notifier portion 112A receives the terminal position (first terminal position) of the first external terminal SW1 (first terminal position) by the work support device (server) 100, the notifier portion 112A determines whether or not the first terminal position is within the area 150e. When the first terminal position is within the area 150e, the notifier portion 112A does not notify the user, and when the first terminal position is outside the area 150e, the notifier portion 112A notifies the stationary computer 105 and the like that the first external terminal SW1 is out of the area 150e.

The notifier portion 112A refers to the second terminal position of the second external terminal SW2 as well as the first external terminal SW1, and when the second terminal position is outside the area 150e, the notifier portion 112A notifies the stationary computer 105 and the like that the second external terminal SW2 is out of the area 150e.

As described above, the notifier portion 112A can notify whether or not the working object 101 such as the industrial machine 101c is located within the area 150 set in the industrial machine 101c. The notifier portion 112A can also notify whether the working object 101, such as the external terminal 101d, is located within the area 150 set in the external terminal 101d.

As shown in FIG. 20B, for example, when the first industrial machine MS1 is the corresponding working object, when the first external terminal SW1 or the like, which is different from the first industrial machine MS1, is located in the area 150d corresponding to the first industrial machine MS1, the area changer portion 113A changes the area 150e of the first external terminal SW1 to the area 150d corresponding to the first industrial machine MS1.

In other words, in a situation where area 150e is set as an area for the first external terminal SW1, when the first external terminal SW1 is located in area 150d of the first industrial machine MS1, the area changer portion 113A changes the area of the first external terminal SW1 from the area 150e to the area 150d.

More specifically, when a worker possessing the first external terminal (non-corresponding working object) SW1 moves to the first industrial machine MS1 in performing the work, and the worker rides the first industrial machine (corresponding working object) MS1, the area changer portion 113A changes the area of the first external terminal (non-corresponding working object) SW1 from the area 150e to the area 150d.

Figure 21:
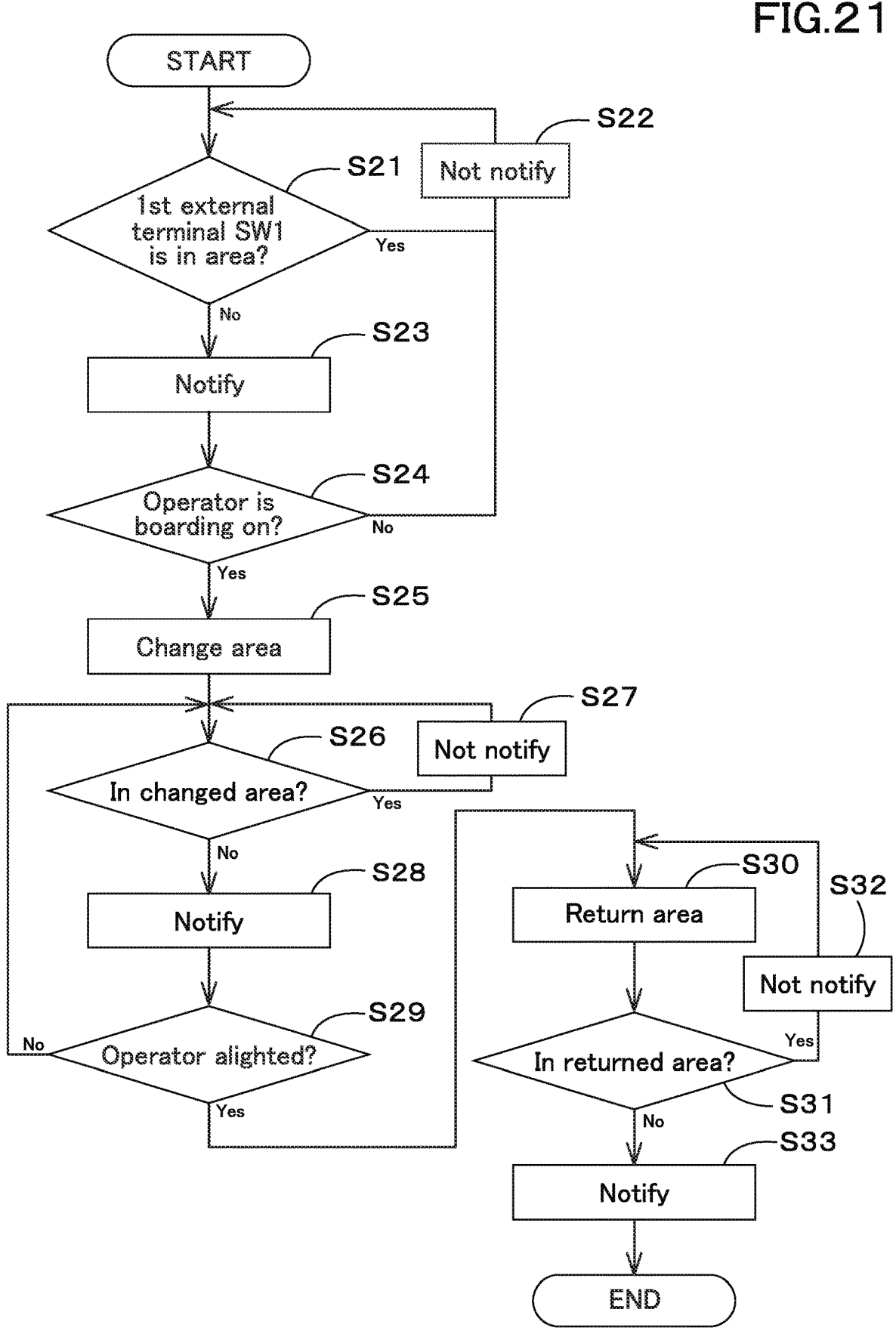
FIG. 21 is a view illustrating an operation flow of an operation to move a first external terminal to an area of a first industrial machine according to embodiments of the present invention.

FIG. 21 shows the operation flow for moving the first external terminal SW1 to the area 150d of the first industrial machine MS1.

As shown in FIG. 21, when the first external terminal SW1 is located within the area (self area) 150e, which is its own area (step S21, Yes), the notifier portion 112A does not notify the user (step S22).

When the first external terminal SW1 moves outside the self area 150e (step S21, No), the notifier portion 112A issues a notification (step S23).

When a worker possessing the first external terminal SW1 enters the area 150d of the first industrial machine MS1 and then the worker rides the first industrial machine MS1 (step S24, Yes), the area changer portion 113A changes the area (self area) 150e of the first external terminal SW1 to the area 150d (step S25).

When the first terminal position of the first external terminal SW1 and the fifth body position of the first industrial machine MS1 are within a predetermined range (within one to two meters), it can be assumed that the worker who possesses the first external terminal SW1 has boarded the first industrial machine MS1.

When the area (self area) 150e of the first external terminal SW1 is changed to area 150d, and the first external terminal SW1 is located in the changed area 150d (step S26, Yes), the notifier portion 112A does not issue notification (step S27).

When the first external terminal SW1 moves outside the modified area 150d (step S26, No), the notifier portion 112A issues a notification (step S28).

When the first external terminal SW1 is separated from the first industrial machine MS1, that is, the worker in possession of the first external terminal SW1 has dismounted (step S29, Yes), the area changer portion 113A returns the area of the first external terminal SW1 (self area) 150d to the area 150e (step S30).

When the area (self area) 150a of the first external terminal SW1 is located within the area (self area) 150e after returning the area (self area) 150a of the first external terminal SW1 to the area (self area) 150e (step S31, Yes), the notifier portion 112A does not issue the notification (step S32).

When the first external terminal SW1 moves outside the self area 150e (step S31, No), the notifier portion 112A issues a notification (step S33).

The work support system 100 includes the area storage device that stores the area 150 defined for each of a plurality of working objects 101, the notifier portion 112A that notifies the working object 101 based on whether the working object 101 is located in the area 150 defined for the working object 101, and the area changer portion 113A changes the area (second area) 150 of the non-corresponding working object to the area (first area) 150 corresponding to the corresponding working object when the non-corresponding working object that is the working object 101 different from the corresponding working object is located in the area corresponding to the corresponding working object that is the predetermined working object 101.

According to this configuration, when a non-corresponding working object moves to an area corresponding to a corresponding working object that is a working object 101, the area of the non-corresponding working object (second area) 150 is changed by the area changer portion 113A to an area corresponding to the corresponding working object (first area). This allows, for example, the corresponding working object and the non-corresponding working object to work together without notifying the non-corresponding working object that the non-corresponding working object is not located in the area (area before the change) 150 before the change.

In other words, when the area 150 of the non-corresponding working object is not located in the area 150 before the change, the notifier portion 112A can notify the non-corresponding working object that the non-corresponding working object has left the area 150. In addition, when the non-corresponding working object enters the area 150 corresponding to the corresponding working object, the area is changed to the area corresponding to the non-corresponding working object (which becomes the area after the change). This allows the notification to be avoided when working together. In summary, it is possible to easily monitor the area even when the responding and non-responding work entities are working together.

The plurality of working objects 101 includes the agricultural machine 101a and the implement 101b connected to the agricultural machine 101a, and the area changer portion 113A changes the area 150 of the implement 101b to the area of the corresponding working object when the implement 101b, the non-corresponding working object, is located in the area 150 of the agricultural machine 101a, which is the corresponding working object.

According to this configuration, for example, when the implement 101b is moved from the area 150, such as a storage area, to the area 150 of the agricultural machine 101a, the work can be continued without notification by the notifier portion 112A, and when it is moved to an area other than the area 150 of the agricultural machine 101a, notification by the notifier portion 112A can be made.

The plurality of working objects 101 includes the external terminal 101d and the industrial machine 101c possessed by the worker performing the work, and the area changer portion 113A changes the area 150 of the external terminal to the area 150 of the industrial machine 101c when the external terminal 101d, which is a non-corresponding working object, is located in the area 150 of the industrial machine 101c, which is a corresponding working object.

According to this configuration, for example, when the worker moves from leaving the external terminal at home to the area 150 of the industrial machine 101c, the work can be continued without notification by the notifier portion 112A, and when the worker moves to an area other than the area 150 of the industrial machine 101c, notification by the notifier portion 112A can be made.

The notifier portion 112A changes the area of the non-corresponding working object to an area corresponding to the corresponding working object, and then does not notify the non-corresponding working object when the non-corresponding working object is located in the area corresponding to the corresponding working object, and when the non-corresponding working object is not located in the area corresponding to the corresponding working object, the notification is made.

According to this configuration, when a non-corresponding working object is located in an area corresponding to the corresponding working object and moves out of the area corresponding to the corresponding working object without performing work, the non-corresponding working object can be monitored by the notifier portion 112A.

Third Embodiment

Figure 22:
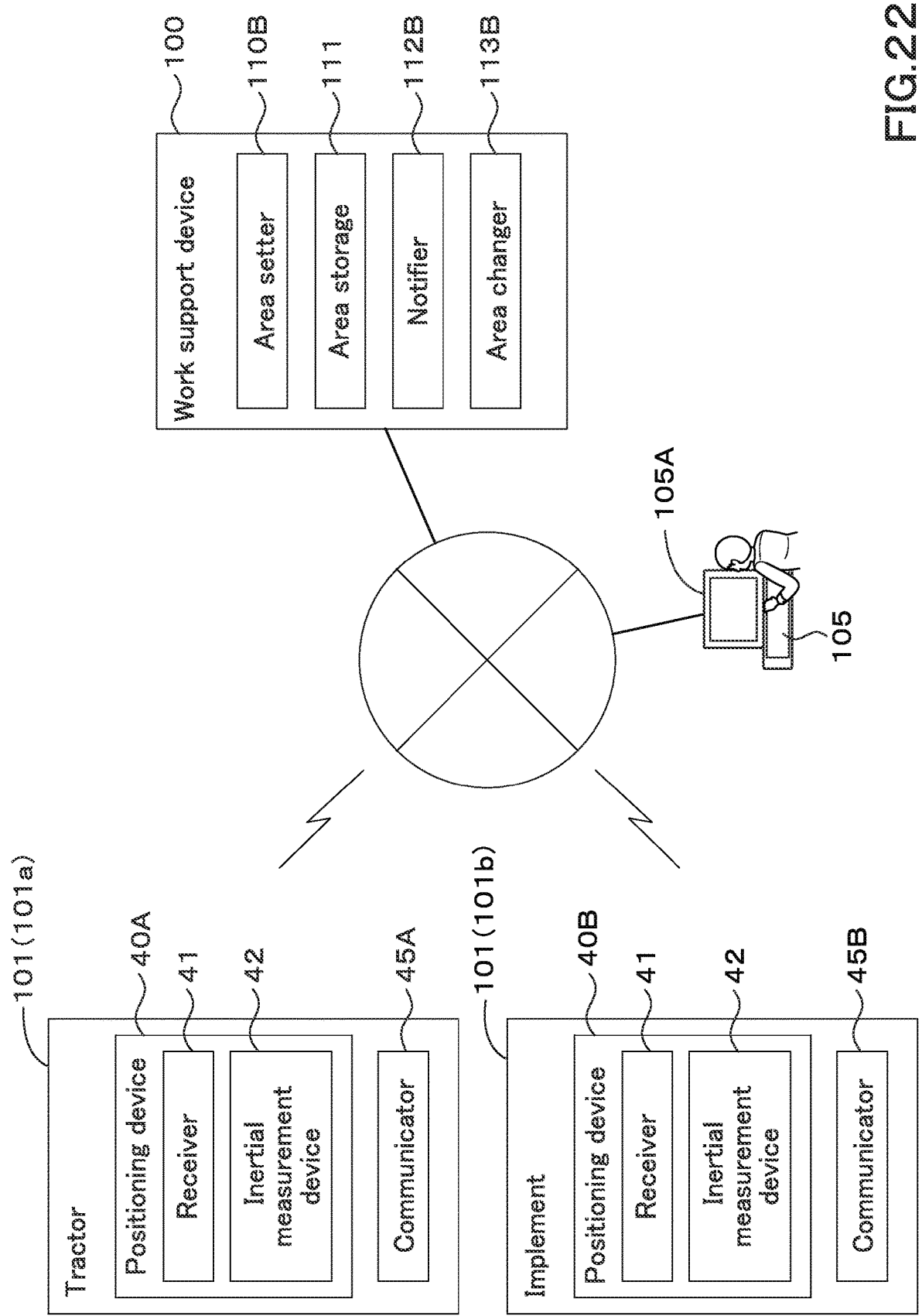
FIG. 22 is a view illustrating a work support system according to a third embodiment of the present invention.

FIG. 22 shows the work support system in the third embodiment. In the third embodiment of the work support system, the different configurations of the work support system in the third embodiment will be described and the common configurations will be omitted.

As shown in FIG. 22, the work support device 100 has an area setter portion 110B, a notifier portion 112B, and an area changer portion 113B. The area setter portion 110B, the notifier portion 112B, and the area changer portion 113B include electrical and electronic circuitry provided in the work support device 100, a program stored in the work support device 100, and the like.

The area setter portion 110B sets the relation between the plurality of areas 150 and the order of the areas 150 for the working object 101. When the area changer portion 113B deviates from the predetermined area 150 among the plurality of areas 150, the area 150 designated in the next order of the predetermined area 150 that deviates is changed to the next area 150.

Figure 23:
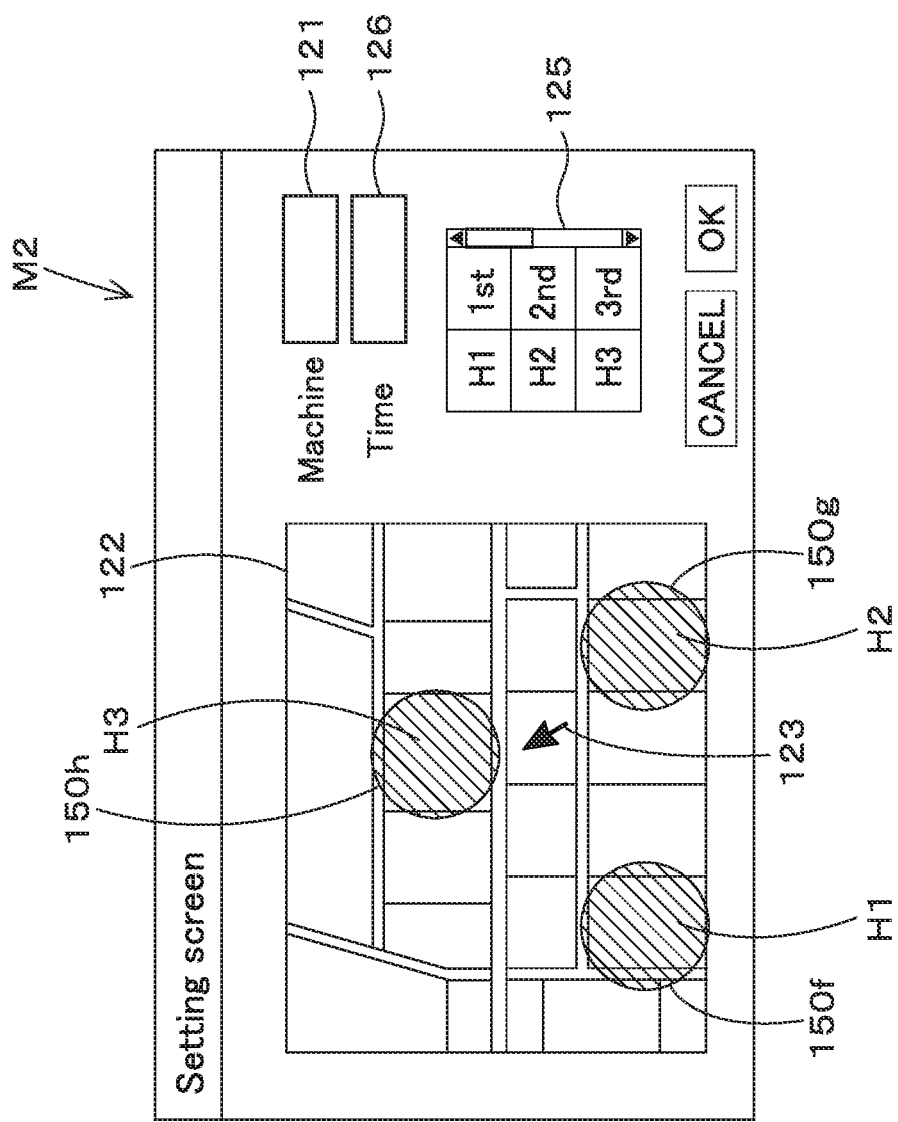
FIG. 23 is a view illustrating a example of a setting screen M2 according to a third embodiment of the present invention.

When the stationary computer 105 is connected to the work support device (server) 100 and a predetermined operation is performed on the stationary computer 105, the area setter portion 110B displays the setting screen M2, as shown in FIG. 23. The setting screen M2 has a working object input portion 121, a map display portion 122, a pointer 123, an order input portion 125, and a time input portion 126.

As shown in FIG. 23, when the work area H1 shown in the map display portion 122 is selected by the pointer 123, the area setter portion 110B sets the area forming the work area Hn (n=1, 2, 3 . . . ) as an area. In the map display portion 122, when a plurality of workplaces H1, H2, and H3 (n=1, 2, 3) are selected, the area setter portion 110B sets the plurality of workplaces H1, H2, and H3 as areas 150f, 150g, and 150h.

The order can be entered in the order input portion 125 for a plurality of work areas Hn (plurality of areas 150). In the setting screen M2, when the decision button 114 is selected, the area setter portion 110B sets the identification information (working object identification information) entered in the working object input portion 121 and the order of the plurality of areas 150f, 150g, and 150h and the plurality of areas 150f, 150g, and 150h.

The time input portion 126 is capable of inputting a date, start time, end time, and other times.

As shown in FIG. 24, the area information (working object identification information, areas 150f, 150g, and 150h, order, and time) is stored in the area storage portion 111 by the area setter portion 110B. As shown in FIG. 24, the area information shows that the areas 150f, 150g, and 150h are worked in order on date 4/18 in the first tractor T1. The area information shown in FIG. 24 is an example and not limited to the area information shown in FIG. 24.

Figure 25:
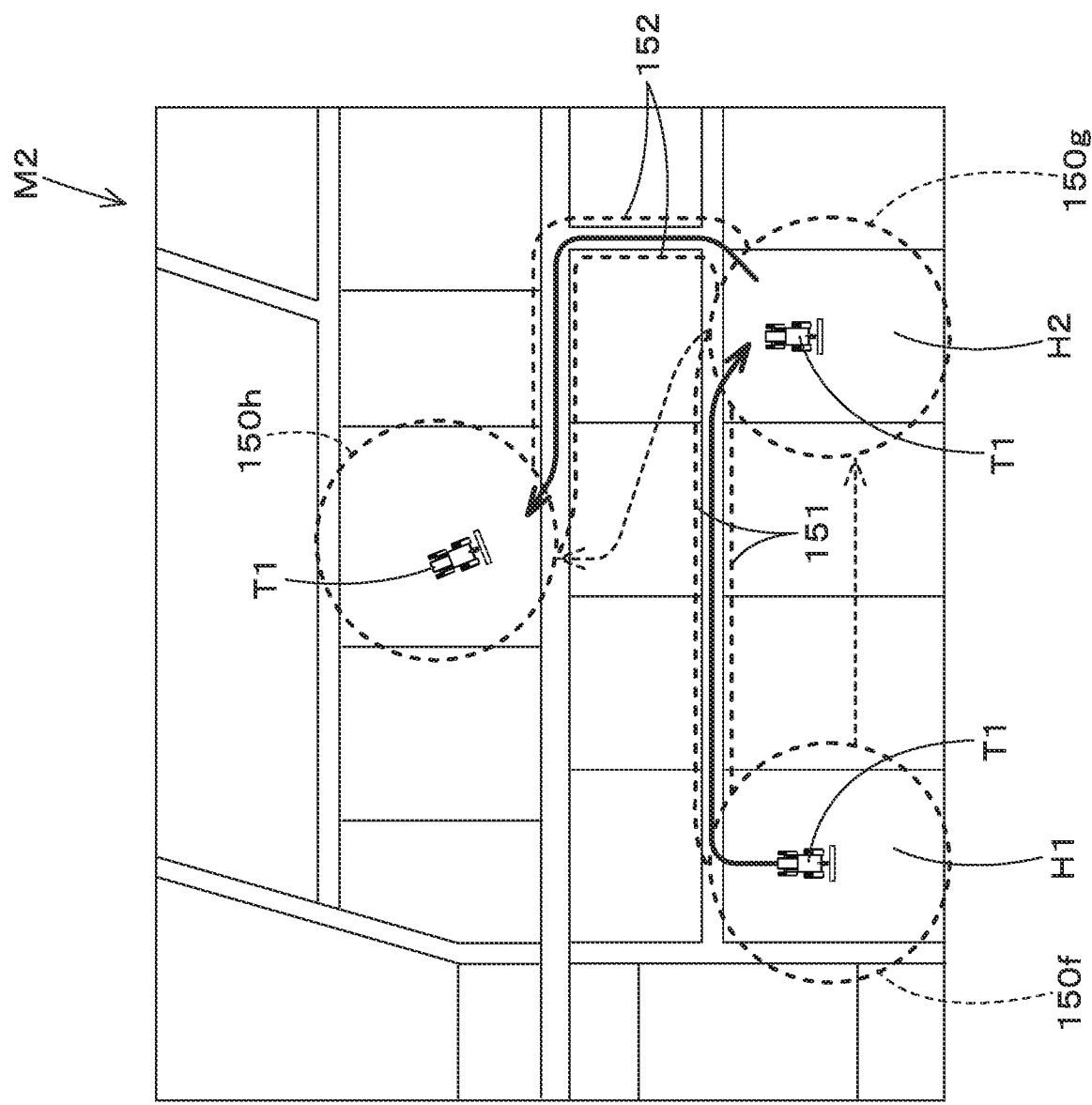
FIG. 25 is an explanation view explaining a changing manner of area according to a third embodiment of the present invention.

As shown in FIG. 25, when the first tractor T1 is located in the first area 150f in performing the work, the notifier portion 112B notifies the user that it is located in the work area H1 corresponding to area 150f. When the first tractor T1 is out of the first area 150f, the area changer portion 113B sets the area corresponding to the first tractor T1 to the second area (work area H2) 150g, and the notifier portion 112B notifies that the area has changed from area (work area H1) 150f to area (work area H2) 150g.

The area changer portion 113B adds a road or other route 151 connecting the first area (work area H1) 150f and the second area (work area H2) 150g as an area. The notifier portion 112B notifies the first tractor T1 that it has deviated from the line 151 when it has deviated from the line 151 before reaching the first area 150f to the second area 150g.

When the first tractor T1 leaves the area 150g after reaching the area 150g, the notifier portion 112B notifies the user that the first tractor T1 has left the area 150g. The notifier portion 112B does not issue notification when the first tractor T1 is located within the area 150g.

When the first tractor T1 is out of the second area (work area H2) 150g, the area changer portion 113B sets the next area of the first tractor T1 to the third area (work area H3) 150h, and the notifier portion 112B notifies the user that the area has changed from area 150g to area 150h.

The area changer portion 113B adds a line 152, such as a road connecting the second area 150g to the third area 150h, as an area. The notifier portion 112B notifies the first tractor T1 that it has deviated from the line 152 when it deviates from the line 152 before it reaches the second area 150g to the third area 150h.

When the first tractor T1 leaves the area 150h after the first tractor T1 reaches the area 150h, the notifier portion 112B notifies the user that the first tractor T1 has left the area 150h. The notifier portion 112B does not issue notification when the first tractor T1 is located in the area 150h.

The work support system 100 includes the notifier portion 112B to issue notification relating to the working object 101 based on whether the working object 101 positions in an area, the area setter portion 110B that sets the relation between the plurality of areas 150 and the order of the areas 150 for the working object 101, and the area changer portion 113B that changes the area designated in the next order of the predetermined area that is out of the predetermined area to the next area when the working object 101 moves out of a predetermined area of the plurality of areas 150.

According to this configuration, it is possible to know by the notifier portion 112B that the working object 101 performed the work while moving in order, and it is possible to know by the notifier portion 112B that the working object 101 performed the work without moving in order.

The area setter portion 110B sets a plurality of work areas where the working object 101 performs work as a plurality of areas 150 and the relation between the order of the work areas and the order of the work areas according to the order of the work, and the area changer portion 113B changes the work area designated in the next order of the predetermined work area that has been removed from the predetermined work area to the next work area when it is removed from the predetermined work area.

According to this configuration, the area of the working object 101 can be automatically and easily changed when the working object 101 is moved from a given work area to the next work area.

The area changer portion 113B adds a route from the predetermined work area to the next work area as an area corresponding to the working object 101 when the working object 101 is out of the predetermined work area.

According to this configuration, it is possible to monitor whether or not the working object 101 is taking a route in the process of moving from a given work area to the next work area.

Fourth Embodiment

Figure 26:
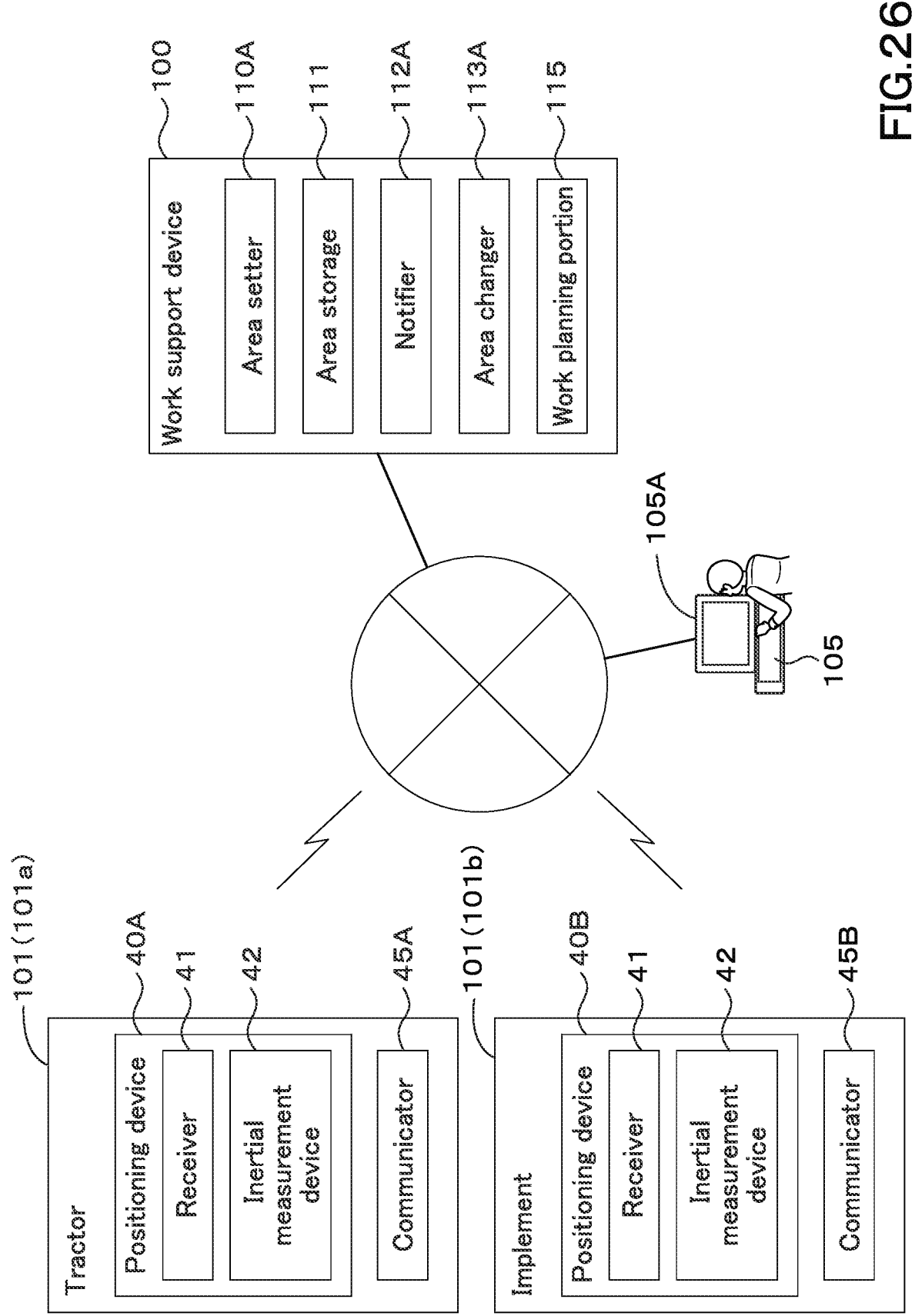
FIG. 26 is a view illustrating a work support system according to a fourth embodiment of the present invention.

FIG. 26 shows the work support system in the fourth embodiment. In the work support system in the fourth embodiment, the different configurations of the work support system in the third embodiment will be described, and the common configurations will be omitted.

As shown in FIG. 26, the work support device 100 has a work planning portion 115. The work planning portion 115 includes electrical and electronic circuits in the work support device 100, a program stored in the work support device 100, and the like.

Figure 27:
FIG. 27 is a view illustrating an example of a creation screen M3 according to a fourth embodiment of the present invention.

When the stationary computer 105 is connected to the work support device (server) 100 and a predetermined operation is performed on the stationary computer 105, as shown in FIG. 27, the area setter portion 110B displays the creation screen M3 that creates a work plan, as shown in FIG. 27. The work plan is a plan for agricultural work to be performed in a field or other work area. The farming operations include, for example, making the bed soil, planting rice, raking, ditching, weeding, harvesting, seeding, fertilizing, applying fertilizer, applying chemicals, and the like.

The creation screen M3 includes a date setter portion 160 for setting the date on which farm work is to be performed, a work setter portion 161 for setting a work site, a work setter portion 162 for setting farm work (work items for farm work), a worker setter portion 163 for setting a farm worker, a time setter portion 164 for setting a work time, and a machine setter portion 165 for setting a work device.

A map of the work area is displayed in the work setter portion 161, and by selecting the work area shown on the map, the work area where the work is to be performed can be set. The work setter portion 162 allows selection or input of work items for the various agricultural operations described above (that is, work items for bed-soil preparation, footpath preparation, plowing, tillage, rice planting, raking, ditching, weeding, harvesting, sowing, fertilization, and chemicals).

The worker setter portion 163 displays a list of names of workers (farmworker names) registered in advance in the work support device 100 and the like, and the worker can be determined by selecting the name of the worker who will perform the work from the list. In the time setter portion 164, the time of day at which the agricultural work is performed can be set. In the machine setter portion 165, the identification information of the working object 101, such as an industrial machine, can be entered.

As described above, according to the work planning portion 115, as shown in FIG. 28, for example, in 4/5, a work plan can be set for each day, such as plowing from 9:00 to 11:00 a.m. at work area H1 using tractor T1, plowing from 1:00 to 3:00 p.m. at work area H2, and weeding from 4:00 to 5:00 p.m. at work area H3, for example.

As shown in FIG. 26, the work support device 100 has an area setter portion 110C, a notifier portion 112C, and an area changer portion 113C. The area setter portion 110C, the notifier portion 112C, and the area changer portion 113C include electrical and electronic circuitry provided in the work support device 100, a program stored in the work support device 100, and the like.

The area setter portion 110C sets the area 150 of the corresponding working object including the work area when the corresponding working object, which is the working object corresponding to the work area indicated in the work plan, is located in the work area indicated in the work plan. For example, the area setter portion 110C refers to the work plan created by the work planning portion 115 to determine whether a predetermined working object (corresponding working object) is located in the work area indicated in the work plan, and when the corresponding working object is located, the area 150 including the work area is set.

Figure 29:
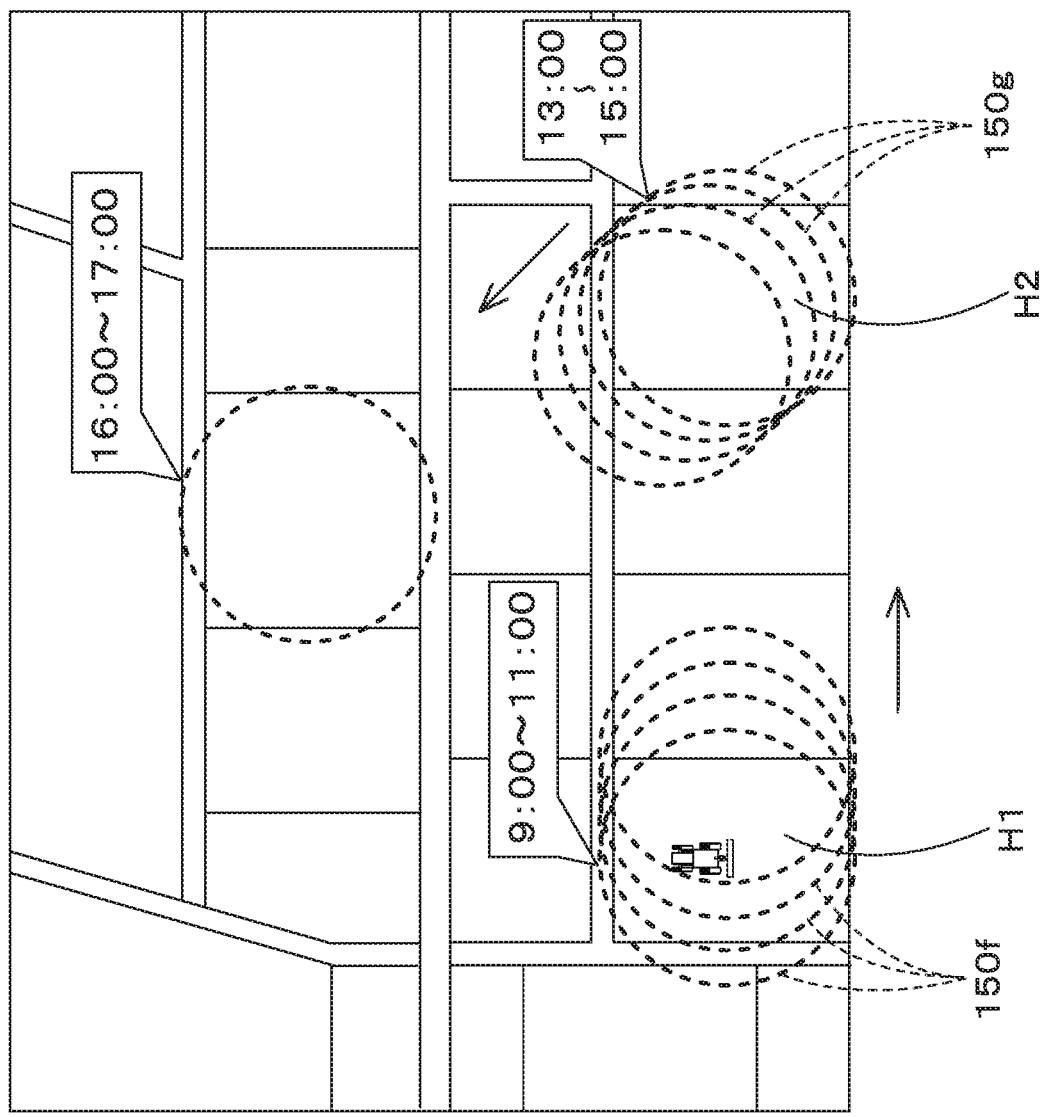
FIG. 29 is an explanation view explaining a moving manner of area according to a fourth embodiment of the present invention.

For example, in a situation where a work plan is prepared as shown in FIG. 28, the area setter portion 110C determines whether or not the first tractor T1 is located in the work area H1. As shown in FIG. 29, when the first tractor T1 is located in the work area H1, the area including the work area H1 is set to the area 150 corresponding to the first tractor T1.

The area changer portion 113C moves the area 150 every time a time passes after the area 150 is set by the area setter portion 110C. The area changer portion 113C, for example, after the area 150 including the work area H1 is set up, moves the area 150 every time the time passes in the work plan towards the next work area H2 after the work area H1.

In more detail, as shown in FIG. 29, since the work is performed from 9:00 a.m. to 11:00 a.m. in the work area H1, the area changer portion 113C starts to gradually move the area 150 toward the work area H2 after the end time of the work in the work area H1 (11:00 a.m.), and at the time of the start time of the work in the work area H2 (13:00 a.m.), the area 150 is moved so that the area 150 includes the entire work area H2.

The area changer portion 113C starts to gradually move the area 150 toward the work area H3 after the end portion of the work period of the work area H2 (3:00 p.m.), and at the start of the work period of the work area H3 (4:00 p.m.), the area 150 is moved so that the area 150 includes the entire work area H3.

In other words, in at least two workplans included in the work plan, the area 113C keeps the area 150 to include the first work area in the time period between the start time of the first work area (the first work area) and the end time of the first work area (the first work area), and when the end time of the first work area has passed, the area 150 is moved toward the next work area (the second work area) to complete the movement of the area 150 before the start of the second work area.

In moving the area 150 from the first work area to the second work area, the area changer portion 113C sets the movement speed of the area at a constant speed (approximately the same speed) and at a movement speed such that when the area reaches the second work area, the center of the area is located at the second work area.

For example, the area changer portion 113C is obtained from a equation "the movement speed=the distance L10 from the first work area to the second work area from the first work area to the second work area÷(time to end work in the first work area–time to start work in the second work area). The notifier portion 112C does not issue notification when the working object 101 is located within the area 150, but issues notification when the working object 101 is located outside the area 150.

The work support device 100 has the area setter portion 110C for setting the area 150, the notifier portion 112C for notifying about the corresponding working object based on whether or not the working object 101 is located in the area 150, and the area changer portion 113C for changing the area 150 corresponding to the working object 101 based on time.

According to this configuration, the area 150 corresponding to the working object 101 can be changed over time, and it is possible to monitor whether or not the working object 101 is in the area 150 that has been changed over time.

The work support device 100 has the work planning portion 115 that creates a work plan including the work area to be worked on, the working object to be worked on at the work area, and a time to perform the work. The area setter portion 110C sets the area of the corresponding working object to include the work area when the corresponding working object, which is the working object 101 corresponding to the work area, is located at the work area indicated in the work plan, and the area changer portion 113C changes the area of the corresponding working object based on the time.

According to this configuration, it is possible to monitor whether the working object 101 is working in the area corresponding to the work area and time specified in the work plan, or whether the working object 101 is in the area at the work area and time.

In the above-mentioned embodiments, the notification destination of the notifier portion 112A, the notifier portion 112B, and the notifier portion 112C was an stationary computer 105, but this is not limited to this, and may be a portable computer.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modifications within and equivalent to a scope of the claims.

What is claimed is:

1. A work support device comprising:
   an area storage configured to store a first area set for a first position determined by a first positioning device on a first working object, and a second area set for a second position determined by a second positioning device on a second working object;
   a notifier configured to issue notification to a monitoring computer as to whether the first position of the first working object is in the first area, and the second position of the second working object is in the second area; and
   an area changer configured to, when the second position of the second working object is in the first area, change the second area to the first area, which is set for the second working object, wherein
   after the area changer has changed the second area to the first area for the second working object, the notifier is configured to issue the notification to the monitoring computer if the second position determined by the second positioning device on the second working object is no longer in the first area.

2. The work support device according to claim 1, wherein
   the first working object includes an agricultural machine and the second working object includes an implement configured to be detachably connected to the agricultural machine, and
   when the implement is connected to the agricultural machine so that the second position of the implement is in the first area, the area changer is configured to change the second area to the first area, which is set for the implement.

3. The work support device according to claim 1, wherein
   the first working object includes an industrial machine and the second working object includes an external terminal held by a worker to perform operation, and
   when the worker gets in the industrial machine so that the second position of the external terminal is in the first area, the area changer is configured to change the second area to the first area, which is set for the external terminal.

4. The work support device according to claim 1, wherein
   after changing the second area to the first area, which is set for the second working object, the notifier does not issue notification when the second position of the second working object is in the first area, and issues the notification when the second position of the second working object is no longer in the first area.

5. The work support device according to claim 2, wherein
   after changing the second area to the first area, which is set for the implement, the notifier does not issue notification when the second position of the implement positions in the first area, and issues the notification when the second position of the implement is no longer in the first area.

6. The work support device according to claim 3, wherein
   after changing the second area to the first area, which is set for the external terminal, the notifier does not issue notification when the second position of the external terminal is in the first area, and issues the notification when the external terminal is no longer in the first area.

7. A work support device comprising:
   an area storage configured to store an agricultural-machine area set for a first position determined by a first positioning device on an agricultural machine and an implement area set for a second position determined by a second positioning device on an implement configured to be detachably connected to the agricultural machine;
   a notifier configured to issue notification to a monitoring terminal as to whether the implement is located within the implement area; and
   an area changer configured to change the implement area set for the implement to the agricultural-machine area when the implement is located within the agricultural-machine area, wherein
   after the area changer has changed the implement area to the agricultural-machine area for the implement, the notifier is configured to issue the notification to the monitoring computer if the second position determined by the second positioning device on the implement is no longer in the agricultural-machine area.

8. The work support device according to claim 7, wherein
   the area changer is configured to change the implement area set for the implement to the agricultural-machine area, when the implement is connected to the agricultural machine.

9. The work support device according to claim 8, wherein
   upon having changed the implement area to the agricultural-machine area for the implement, the area changer is configured to change the agricultural-machine area for the implement back to the implement area set for the implement prior to having changed the implement area to the agricultural-machine area, when the implement is disconnected from the agricultural machine.

10. A work support device comprising:
    an area storage configured to store an industrial-machine area set for a first position determined by a first positioning device on an industrial machine and an external-terminal area set for a second position determined by a second positioning device on an external terminal held by an operator to operate the industrial machine;
    a notifier configured to issue notification to a monitoring terminal as to whether the external terminal is located within the external-terminal area; and
    an area changer configured to change the external-terminal area set for the external terminal to the industrial-machine area when the external terminal is located within the industrial-machine area, wherein
    after the area changer has changed the external-terminal area to the industrial-machine area for the external terminal, the notifier is configured to issue the notification to the monitoring computer if the second position determined by the second positioning device on the external terminal is no longer in the industrial-machine area.

11. The work support device according to claim 10, wherein
    the area changer is configured to change the external-terminal area set for the external terminal to the industrial-machine area, when the operator holding the external terminal is on the industrial machine.

12. The work support device according to claim 11, wherein
    upon having changed the external-terminal area to the industrial-machine area for the external terminal, the area changer is configured to change the industrial-machine area for the external terminal back to the external-terminal area set for the external terminal prior to having changed the external-terminal area to the industrial-machine area, when the operator holding the external terminal drops off the industrial machine.

\* \* \* \* \*